(12) United States Patent
Zhang et al.

(10) Patent No.: US 10,554,882 B2
(45) Date of Patent: Feb. 4, 2020

(54) PANORAMIC CAMERA AND PHOTOGRAPHING METHOD THEREOF

(71) Applicant: Hangzhou Hikvision Digital Technology Co., Ltd., Zhejiang (CN)

(72) Inventors: Huahua Zhang, Zhejiang (CN); Xiaojiang Wang, Zhejiang (CN); Changzhi Ke, Zhejiang (CN)

(73) Assignee: HANGZHOU HIKVISION DIGITAL TECHNOLOGY CO., LTD. (CN)

( * ) Notice: Subject to any disclaimer, the term of this patent is extended or adjusted under 35 U.S.C. 154(b) by 0 days.

(21) Appl. No.: 16/310,075

(22) PCT Filed: Apr. 11, 2017

(86) PCT No.: PCT/CN2017/080032
§ 371 (c)(1),
(2) Date: Dec. 14, 2018

(87) PCT Pub. No.: WO2017/215331
PCT Pub. Date: Dec. 21, 2017

(65) Prior Publication Data
US 2019/0335099 A1 Oct. 31, 2019

(30) Foreign Application Priority Data

Jun. 14, 2016 (CN) .......................... 2016 1 0416973

(51) Int. Cl.
*H04N 7/18* (2006.01)
*H04N 5/232* (2006.01)
*G06T 3/40* (2006.01)

(52) U.S. Cl.
CPC ....... *H04N 5/23238* (2013.01); *G06T 3/4007* (2013.01); *G06T 3/4038* (2013.01); *H04N 7/181* (2013.01)

(58) Field of Classification Search
CPC .................................................. H04N 5/23238
(Continued)

(56) References Cited

U.S. PATENT DOCUMENTS

| 6,522,325 | B1 * | 2/2003 | Sorokin | G03B 37/04 |
| | | | | 345/427 |
| 9,438,800 | B1 * | 9/2016 | Kozko | G06T 11/00 |

(Continued)

FOREIGN PATENT DOCUMENTS

| CN | 101093348 | 12/2007 |
| CN | 102355545 | 2/2012 |

(Continued)

OTHER PUBLICATIONS

Office Action in Chinese application No. 201610416973.2 dated Mar. 25, 2019; 5 pages.

(Continued)

*Primary Examiner* — Leron Beck
(74) *Attorney, Agent, or Firm* — Mark E. Bandy; Rankin, Hill & Clark LLP

(57) ABSTRACT

The present application discloses a panoramic camera and a shooting method thereof, the panoramic camera includes: N sub-cameras, a synchronization control module, a stitching and correcting module, configured for caching successive m rows of pixel values in the shot image in a sliding window manner, and correcting the pixel values according to a preset correction table and the cached m-row pixel values, and sequentially outputting the corrected pixel values of each row, wherein m is greater than the sum of a preset maximum number of distortion rows and 2, and m is smaller than the total number of rows of the shot image; a stitching fusion module, configured for stitching the corrected images into a stitched image according to the overlapping portions of the images shot by the sub-cameras, wherein the images are shot (Continued)

synchronously by the sub-cameras under the control of the synchronization control module; and a transmission module. The panoramic camera of the present application has better processing efficiency, better processing quality, and is more advantageous for system design miniaturization.

13 Claims, 10 Drawing Sheets

(58) Field of Classification Search
USPC .............................................................. 348/38
See application file for complete search history.

(56) References Cited

U.S. PATENT DOCUMENTS

| | | | |
|---|---|---|---|
| 9,811,946 B1* | 11/2017 | Hung | H04N 5/23238 |
| 2004/0061787 A1* | 4/2004 | Liu | H04N 5/232 |
| | | | 348/218.1 |
| 2007/0206945 A1* | 9/2007 | DeLorme | G03B 41/00 |
| | | | 396/332 |
| 2010/0066846 A1 | 3/2010 | Sarwari et al. | |
| 2014/0098185 A1 | 4/2014 | Davari et al. | |
| 2014/0368609 A1 | 12/2014 | Chang et al. | |
| 2015/0138311 A1 | 5/2015 | Towndrow | |
| 2015/0373266 A1* | 12/2015 | Hsieh | H04N 5/23238 |
| | | | 348/36 |
| 2016/0105618 A1* | 4/2016 | Shimauchi | H04N 5/247 |
| | | | 386/210 |
| 2016/0295108 A1* | 10/2016 | Cao | H04N 5/23238 |
| 2017/0126985 A1* | 5/2017 | Orner | H04L 12/42 |
| 2017/0140791 A1* | 5/2017 | Das | G11B 27/036 |

FOREIGN PATENT DOCUMENTS

| | | |
|---|---|---|
| CN | 102385742 | 3/2012 |
| CN | 102611822 | 7/2012 |
| CN | 102857739 | 1/2013 |
| CN | 103338343 | 10/2013 |
| CN | 103646385 | 3/2014 |
| CN | 104933730 | 9/2015 |
| JP | H08191440 | 7/1996 |

OTHER PUBLICATIONS

Extended Search Report; European Application No. 17812443.4; dated Apr. 23, 2019; 11 pages.
Use of A236 Video DSP Chip for Dewarping Live Images; Anonymous; Mar. 5, 1998 (Mar. 5, 1998), XP055580012, Retrieved from the Internet: URL:http://www.ic72.com/pdf_file/a/154637.pdf; 5 pages.
Bayer filter; Anonymous; Wikipedia Apr. 6, 2016 (Apr. 6, 2016), XP055580219, Retrieved from the Internet: URL:https://en.wikipedia.org/w/index.php?title=Bayer filter&oldid=713965003; 7 pages.

* cited by examiner

| G11 | R12<br>G12 | G13 | R14<br>G14 | ...... | G1(n−1) | R1n<br>G1n |
|---|---|---|---|---|---|---|
| B21<br>G21 | G22 | B23<br>G23 | G24 | ...... | B2(n−1)<br>G2(n−1) | G2n |
| G11 | R12<br>G12 | G13 | R14<br>G14 | ...... | G1(n−1) | R1n<br>G1n |
| B21<br>G21 | G22 | B23<br>G23 | G24 | ...... | B2(n−1)<br>G2(n−1) | G2n |
FIG. 14
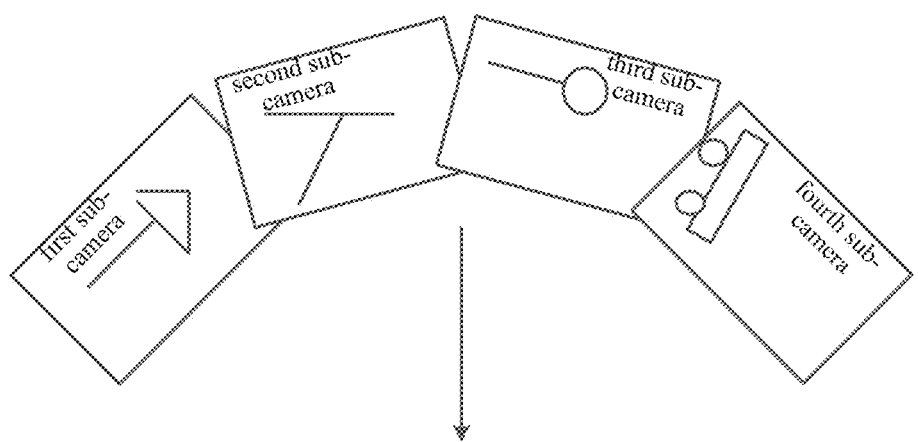
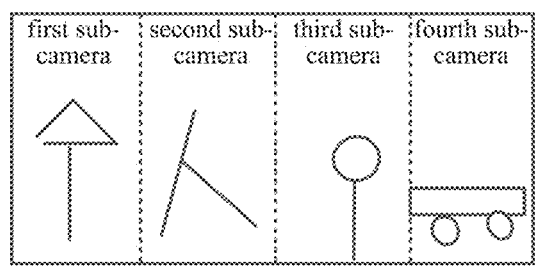
FIG. 15

PANORAMIC CAMERA AND PHOTOGRAPHING METHOD THEREOF

The present application claims the priority to a Chinese Patent Application No. 201610416973.2, filed with China National Intellectual Property Administration on Jun. 14, 2016 and entitled "PANORAMIC CAMERA AND PHOTOGRAPHING METHOD THEREOF", which is incorporated herein by reference in its entirety.

TECHNICAL FIELD

The present application relates to the field of video monitoring, and in particular, to a panoramic camera and a shooting method of the panoramic camera.

BACKGROUND

In order to achieve full coverage of the key monitoring areas, a plurality of cameras are generally used for shooting. For example, for video monitoring of a crossroad of an urban main road, a plurality of network cameras are installed and arranged with respect to various directions to achieve a 360-degree monitoring without dead angle.

However, in the above technical solution, each network camera independently transmits video data to the monitoring center and the video data is displayed independently on the large screen of the monitoring center, which is not only costly, but is also greatly affected in the visual experience due to displaying of the independent scenes to the viewer.

In order to solve the above problem, the real-time videos acquired by the plurality of network cameras at the front-end are usually transmitted to the central server, and a complete panoramic image may be formed through a composition processing at the backend on the videos. However, the respectively acquiring of the videos by the plurality of network cameras and the transmissions over the network would result in different delays. Due to different delays, there may be a mismatch in image stitching, resulting in problems such as misalignment or overlapping of moving objects in the composite image.

On the other hand, although there is also a solution for obtaining a panoramic image by directly stitching real-time videos acquired by a plurality of network cameras or a plurality of cameras of the network camera at the front-end. However, there is a problem that the consumption of system resources is large and the stitching effect is not good.

SUMMARY

The purpose of the present application is to provide a panoramic camera and a shooting method of the panoramic camera, which can improve the processing efficiency, improve the processing quality, and make the system design more compact.

In a first aspect of the present application, a panoramic camera is provided, including:

N sub-cameras, N is greater than 2; each sub-camera captures a different angle; an image shot by a sub-camera partially overlaps with an image shot by at least one of other sub-cameras in the panoramic camera;

a synchronization control module, configured for controlling synchronous shooting of N sub-cameras;

a stitching and correcting module, configured for caching successive m rows of pixel values in the shot image in a sliding window manner, and correcting the pixel values according to a preset correction table and the cached m-row pixel values, and sequentially outputting the corrected pixel values of each row, wherein m is greater than the sum of a preset maximum number of distortion rows and 2, and m is smaller than the total number of rows of the shot image;

a stitching fusion module, configured for stitching the images into a stitched image according to the overlapping portions of the images shot by the sub-cameras, wherein the images are shot synchronously by the sub-cameras under the control of the synchronization control module;

a transmission module, configured for transmitting, through a communication network, the stitched image output by the stitching fusion module.

In another embodiment of the present application, images shot by the N sub-cameras are images in Bayer format, and the panoramic camera further includes: an interpolation module, configured for performing RGB interpolation on the images shot by the N sub-cameras, and transmitting the RGB-interpolated images to the stitching and correcting module.

In another embodiment of the present application, the images shot by the N sub-cameras is images in Bayer format, and the panoramic camera further includes a G interpolation module and an RB interpolation module, wherein, the G interpolation module is configured for performing G interpolation on the images of Bayer format shot by the N sub-cameras, and transmitting the G-interpolated images to the stitching and correcting module;

the stitching and correcting module is configured for correcting the G-interpolated images, and transmitting the corrected image to the RB interpolation module;

the RB interpolation module is configured for performing R interpolation and B interpolation on the corrected image.

In another embodiment of the present application, the panoramic camera further includes:

a bilinear interpolation module, configured for performing a bilinear interpolation on an image corrected by the stitching and correcting module through generating a second pixel value, according to position of the target dot on an original image, with reference to four pixels around the target dot, and transmitting the bilinear interpolated image to the stitching fusion module.

In another embodiment of the present application, the panoramic camera further includes:

an image rotation module, configured for rotating the images synchronously shot by the sub-cameras by 90°, and transmitting the rotated images to the stitching and correcting module.

In another embodiment of the present application, the stitching and correcting module is further configured for receiving an image that is interpolated by the G interpolation module, and transmitting the corrected image to the RB interpolation module.

In another embodiment of the present application, each sub-camera includes a photosensitive sensor and a lens, any two sub-cameras of the sub-cameras are spaced apart by the same angle with each other, and each sub-camera is at the same angle to the ground plane.

In a second aspect of the present application, a shooting method of the panoramic camera is provided, the panoramic camera includes N sub-cameras, N is greater than 2; each sub-camera captures a different angle; an image shot by a sub-camera partially overlaps with an image shot by at least one of other sub-cameras in the panoramic camera; the method includes the following steps:

controlling the N sub-cameras to shoot synchronously;

correcting the images shot by the sub-cameras synchronously in a stitching manner includes the following sub-steps: caching successive m rows of pixel values in the shot images in a sliding window manner, and correcting the pixel values according to a preset correction table and the cached m-row pixel values, and sequentially outputting the corrected pixel values of each row, wherein m is greater than the sum of a preset maximum number of distortion rows and 2, and m is smaller than the total number of rows of the shot images;

stitching, according to the overlapping portion of the images shot by the sub-cameras, the images into one stitched image;

transmitting the stitched image over a communication network.

In another embodiment of the present application, the images shot by the N sub-cameras are in Bayer format, and the method further includes the step of performing RGB interpolation on the images shot by the respective sub-cameras.

In another embodiment of the present application, the images shot by the N sub-cameras are in Bayer format, and before correcting the images shot by the sub-cameras synchronously in a stitching manner, the method further includes:

performing G interpolation on the images shot by the sub-cameras;

after correcting the images shot by the sub-cameras synchronously in a stitching manner, the method further includes:

performing R interpolation and B interpolation on the images being performed G interpolation and corrected in a stitching manner. In another embodiment of the present application, after the step of controlling the synchronous shooting of the N sub-cameras, the method further includes:

rotating the images shot synchronously by the N sub-cameras by 90°.

In another embodiment of the present application, before the step of transmitting the stitched image over a communication network, the method further includes the step of performing image compression on the stitched image.

Compared with the prior art, the embodiments of the present application have at least the following differences and effects:

the stitching and correcting module performs local caching (row caching) on the shot images, which effectively solves the problems arise in the prior art in the process of performing caching on all frames and then reading and correcting the shot images one frame by one frame, the process of stitching and correcting does not itself consume memory bandwidth, thereby greatly reducing the consumption of system resources.

Further, by performing G interpolation processing on the shot images first, then performing stitching and correcting, and finally performing RB interpolation processing, the storage control of the stitching and correcting module can be reduced by half, and the resource consumption is significantly reduced.

Further, the overall system design is simple, which is advantageous for design miniaturization.

Further, the row cache based stitching and correcting processing combined with the Bayer interpolation algorithm can achieve the stitching and correcting processing well while ensuring the image quality.

In a third aspect of the present application, a panoramic camera is provided, the panoramic camera includes N sub-cameras, a housing, a processor, a memory, a circuit board, and a power supply circuit; wherein N is greater than 2; each sub-camera captures a different angle; an image shot by a sub-camera partially overlaps with an image shot by at least one of other sub-cameras in the panoramic camera; the circuit board is disposed inside the space enclosed by the housing, and the processor and the memory are disposed on the circuit board; the power supply circuit is used for powering various circuits or devices of the panoramic camera; the memory is used for storing executable program code; the processor runs a program corresponding to the executable program code by reading the executable program code stored in the memory for performing the above-described shooting method.

In a fourth aspect of the present application, there is provided an executable program code for being executed to perform the above-described shooting method.

In a fifth aspect of the present application, there is provided a storage medium for storing executable program code for being executed to perform the above-described shooting method.

It should be understood that within the scope of the present application, the various technical features of the present application and the technical features specifically described below (as in the embodiments) may be combined with each other to constitute a new or preferred technical solution. Due to space limitations, we will not repeat them here.

BRIEF DESCRIPTION OF THE DRAWINGS

In order to describe the technical solutions of embodiments of the present application and of the prior art more clearly, a simple introduction of the drawings required in the description of the embodiments and of the prior art will be given. Obviously, the drawings described below are just for some embodiments of the present application and other drawings may be obtained by those of ordinary skills in the art based on these drawings without any creative effort.

FIG. 14 is a schematic diagram showing image data of Bayer data after G interpolation in an embodiment;

FIG. 15 is a schematic diagram showing vertically stitching of images in an embodiment of the present application;

Figure 1:
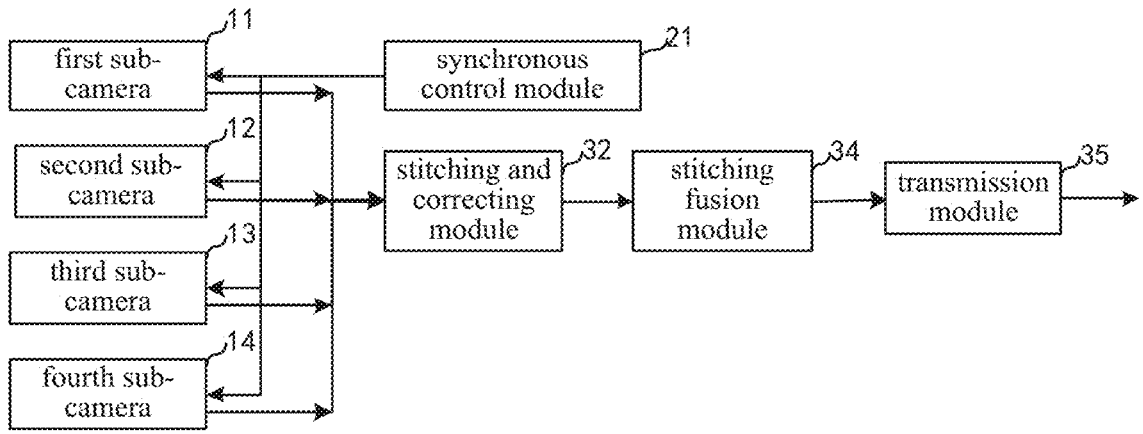
FIG. 1 is a schematic structural diagram of a panoramic camera according to an embodiment of the present application.

In the drawings, 11: first sub-camera; 12: second sub-camera; 13: third sub-camera; 14: fourth sub-camera; 21: synchronous control module; 31: G interpolation module; 32: stitching and correcting module; 33: RB interpolation module; 34: stitching fusion module; 35: transmission module; 322: interpolation module.

DETAILED DESCRIPTION

To make the purposes, technical solutions, and advantages of the present application more comprehensible, the following is a detailed description of the present application with reference to the accompanying drawings and embodiments. Obviously, the described embodiments are merely a part but not all of the embodiments of the present application. Based on the embodiments of the present application, all other embodiments obtained by those of ordinary skill in the art without making creative work are within the scope of this application.

In the following description, numerous technical details are set forth in order to provide the reader with a better understanding of the present application. However, those skilled in the art can understand that the technical solutions claimed in the claims of the present application can be implemented without these technical details and various changes and modifications based on the following embodiments.

In order to make the objects, technical solutions and advantages of the present application more clear, the embodiments of the present application will be further described in detail below with reference to the accompanying drawings.

Referring to FIG. 1, a first embodiment of the present application provides a panoramic camera, including:

a first sub-camera 11, a second sub-camera 12, a third sub-camera 13 and a fourth sub-camera 14, wherein each of the sub-cameras has a different shooting angle, an image shot by a sub-camera partially overlaps with an image shot by at least one of other sub-cameras in the panoramic camera;

a synchronization control module 21, configured for controlling the first sub-camera 11, the second sub-camera 12, the third sub-camera 13 and the fourth sub-camera 14 to synchronously shoot;

a stitching and correcting module 32, configured for caching successive m rows of pixel values in the shot image in a sliding window manner, and correcting the pixel values according to a preset correction table and the cached m rows of pixel values, and sequentially outputting the corrected each row of pixel values, wherein m is greater than the sum of a preset maximum number of distortion rows and 2, and m is smaller than the total number of rows of the shot image;

a stitching fusion module 34, configured for stitching the images into a stitched image according to the overlapping portions of the images shot by the first sub-camera 11, second sub-camera 12, third sub-camera 13 and fourth sub-camera 14, wherein the images are shot synchronously by the sub-cameras under the control of the synchronization control module; and a transmission module 35, configured for transmitting, through a communication network, the stitched image output by the stitching fusion module 32.

In the above embodiment or other embodiments, each of the sub-cameras includes a photosensitive sensor and a lens, any two sub-cameras of the sub-cameras are spaced apart by the same angle with each other, and each of the sub-cameras is at the same angle to the ground plane.

Figure 4:
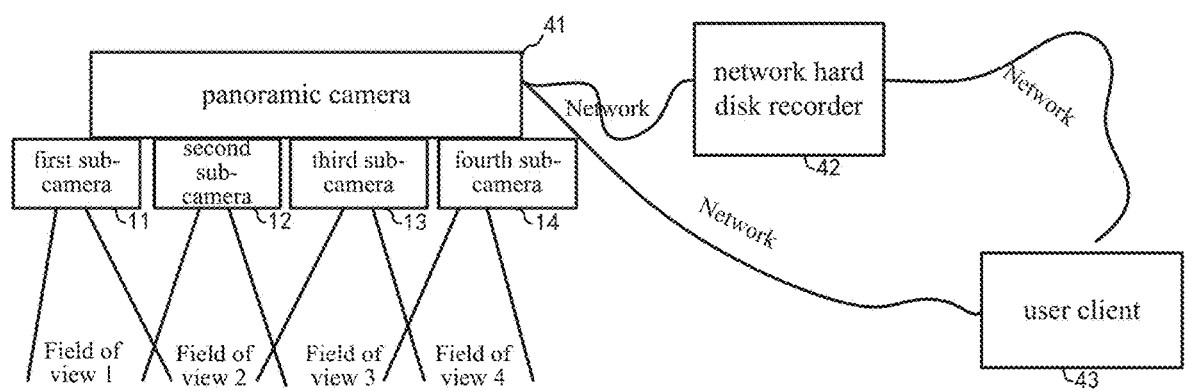
FIG. 4 is a schematic diagram of a network structure for a panoramic camera according to an embodiment of the present application.

The network structure of the above panoramic camera can be seen in FIG. 4, wherein the panoramic camera 41 includes a first sub-camera 11, a second sub-camera 12, a third sub-camera 13 and a fourth sub-camera 14, and is connected to a network hard disk recorder 42 and a user client 43 via the network.

The technical details of the panoramic camera in the present embodiment will be further described below.

In the present embodiment, the angles of the sub-cameras of the panoramic camera are set differently, so that when the sub-cameras are simultaneously shooting, the shot images obtained are not completely identical. At the same time, the angles of view of two adjacent sub-cameras partially overlap, so that an image shot by a sub-camera partially overlaps with an image shot by at least one of other sub-cameras in the panoramic camera. In an embodiment of the present application, the size and direction of the overlap area may be determined by the installation parameters of each sub-camera.

Figure 5:
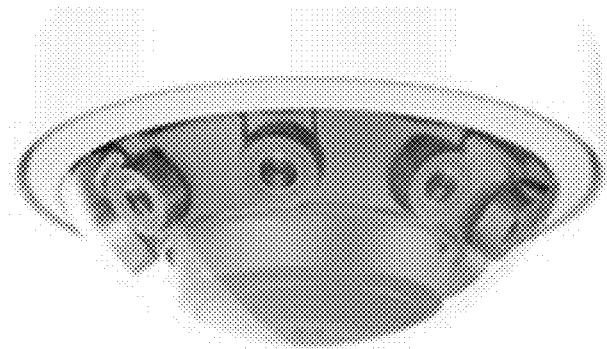
FIG. 5 is a schematic diagram of a panoramic camera according to an embodiment of the present application.

The setting of each sub-camera of the panoramic camera can also be illustrated by another embodiment of the present application. As shown in FIG. 5, the panoramic camera has eight cameras. Each sub-camera includes a light sensor and a lens, any two sub-cameras of the sub-cameras are spaced apart by the same angle with each other, and each sub-camera has the same angle to the ground plane. However, those skilled in the art can understand that in other embodiments of the present application, the angles of the sub-cameras can also be set differently, and the angle between each sub-camera and the ground plane can also be set differently.

Further, the photosensitive sensor in each sub-camera of the panoramic camera may be a Complementary Metal Oxide Semiconductor (CMOS) sensor, a Charge-coupled Device (CCD) sensor, or the like.

The synchronization control module 21 of the panoramic camera may simultaneously transmit control signals to the first sub-camera 11, the second sub-camera 12, the third sub-camera 13, and the fourth sub-camera 14, so that synchronous control of shooting of each sub-camera can be realized. For example, in one embodiment of the present application, the synchronization control module 21 may transmit a synchronous shooting electrical signal to the photosensitive sensors of each sub-camera, thereby controlling the synchronous shooting of each sub-camera. In another embodiment, the synchronization control module 21 may also transmit a synchronous shooting electrical signal to the electronic shutters of each sub-camera, thereby controlling the synchronous shooting of each sub-camera. It can be understood by those skilled in the art that the camera is shooting under the control of an external electrical signal is prior art, which is not described herein.

It should be noted that, in the stitching and correcting module 32 of the panoramic camera, "caching successive m rows of pixel values in the shot images in a sliding window manner" means that the first to m-th rows are cached firstly; then, the new row is added to the cache in turn, and the first cached row is discarded according to the principle of first in first out (FIFO), so that always only m rows are in the cache until all the rows of an image have been added to the cache. Specifically, the first to m-th rows are cached firstly, the m+1-th row is added and the first row is discarded, the m+2-th row is added and the second row is discarded, the m+3-th row is added and the third row is discarded, . . . . this is done until the last row of the image is added to the cache (in this case the last m rows of the image are in the cache).

The following is a brief description of the operation process of the panoramic camera of the present embodiment.

First, the synchronization control module 21 controls the first sub-camera 11, the second sub-camera 12, the third sub-camera 13 and the fourth sub-camera 14 to perform synchronous shooting, and the obtained images are transmitted to a stitching and correcting module 32. The stitching and correcting module 32 performs stitching and correcting on the shot images. Specifically, successive m rows of pixel values in the shot image are cached in a sliding window manner, and the pixel values are corrected according to a preset correction table and the cached m rows of pixel values, and the corrected m rows of pixel values are sequentially output, wherein m is greater than the sum of a preset maximum number of distortion rows and 2, and m is smaller than the total number of rows of the shot image, and the stitched corrected image is transmitted to a stitching fusion module 34. Thereafter, the stitching fusion module 34 stitches, according to the overlapping portion of images shot by the sub-cameras, the images into one stitched image, and transmits the stitched image to a transmission module 35. Lastly, the transmission module 35 transmits the stitched image over the communication network.

The advantages of this embodiment are as follows:

through partially caching (row caching) the shot images by the stitching and correcting module, the problems in the prior art in the process of caching all frames and then reading and correcting the shot images one frame by one frame can be effectively solved, such that the process of stitching and correcting does not itself consume memory bandwidth, thereby greatly reducing the consumption of system resources. The design of the overall system facilitates miniaturization of the design.

Figure 3:
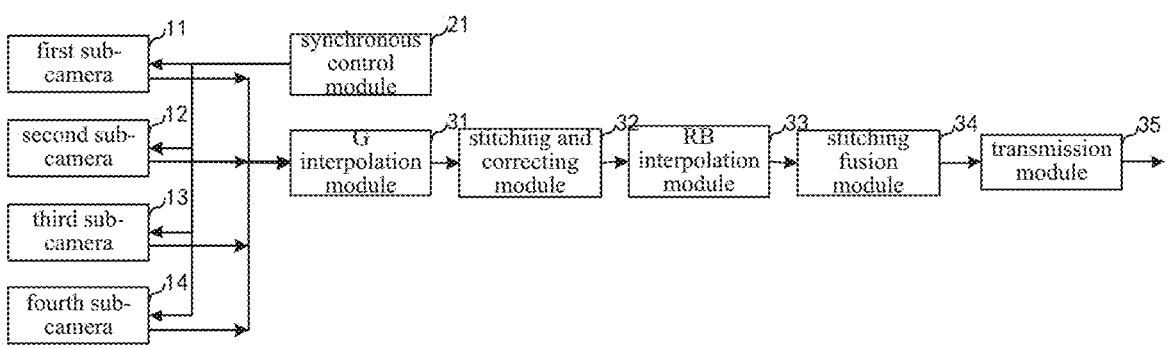
FIG. 3 is a schematic structural diagram of a panoramic camera according to another embodiment of the present application.

Referring to FIG. 3, a second embodiment of the present application provides a panoramic camera, which includes the components of the first embodiment. In addition, the panoramic camera of this embodiment further includes:

a G interpolation module 31, configured for performing G interpolation on the images shot by the first sub-camera 11, the second sub-camera 12, the third sub-camera 13 and the fourth sub-camera 14;

a RB interpolation module 33, configured for performing R interpolation and B interpolation on the G-interpolated image.

As shown in FIG. 3, the connection relationship of the modules in the panoramic camera is as follows:

the first sub-camera 11, the second sub-camera 12, the third sub-camera 13 and the fourth sub-camera 14 output the shot image to the G interpolation module 31;

the G interpolation module 31 outputs the processed shot images to the stitching and correcting module 32;

the stitching and correcting module 32 outputs the processed shot images to the RB interpolation module 33;

the RB interpolation module 33 outputs the processed images to the stitching fusion module 34;

the stitching fusion module 34 outputs the processed images to the transmission module 35.

The scheme for the G interpolation module 31 performing G interpolation on the images shot by the first sub-camera 11, the second sub-camera 12, the third sub-camera 13, and the fourth sub-camera 14 in the present embodiment will be specifically described below:

$$H=|G_{ij}-G_{i(j+2)}|+|2*B_{i(j+1)}-B_{i(j-1)}-B_{i(j+3)}|$$

$$V=|G_{(i-1)(j+1)}-G_{(i+1)(j+1)}|+|2*B_{i(j+1)}-B_{(i-2)(j+1)}-B_{(i+2)(j+1)}|$$

wherein, H is the horizontal direction parameter and V is the vertical direction parameter.

If H<V, then edgeDirection=0, wherein the edgeDirection is the edge direction, and then:

$$G_{i(j+1)} = \frac{[G_{ij} + G_{i(j+2)}]}{2} + [2*R_{i(j+1)} - R_{i(j-1)} - R_{i(j+3)}]/4. \quad \text{[Formula 1]}$$

If H>V, then edgeDirection=1, and then:

$$G_{i(j+1)} = \frac{[G_{(i-1)(j+1)} + G_{(i+1)(j+1)}]}{2} + [2*R_{i(j+1)} - R_{(i-2)(j+1)} - R_{(i+2)(j+1)}]/4. \quad \text{[Formula 2]}$$

If H=V, then edgeDirection=2, and then:

$$G_{i(j+1)} = \frac{[G_{ij} + G_{i(j+2)} + G_{(i-1)(j+1)} + G_{(i+1)(j+1)}]}{4} + [2*R_{i(j+1)} - R_{i(j-1)} - R_{i(j+3)} + 2*R_{i(j+1)} - R_{(i-2)(j+1)} - R_{(i+2)(j+1)}]/8 \quad \text{[Formula 3]}$$

wherein, R represents the red component, G represents the green component, B represents the blue component, and i, j represents coordinate values perpendicular to each other, and the dot at the position of [i, j] is a green dot, the dots at the position of [(i−1), j] and the position of [(i+1), j] are red dots, and the dots at the position of [i,(j−1)] and the position of [i,(j+1)] are green dots.

The scheme for the RB interpolation module 33 performing R interpolation and B interpolation on the G-interpolated image in the present embodiment is specifically described below:

$$R_{ij}=G_{ij}+\{[R_{i(j-1)}-G_{i(j-1)}]+[R_{i(j+1)}-G_{i(j+1)}]\}/2 \quad \text{[Formula 4]}$$

$$B_{ij}=G_{ij}+\{[R_{(i-1)j}-G_{i-1j}]+[R_{(i+1)j}-G_{(i+1)j}]\}/2 \quad \text{[Formula 5]}$$

$$B_{i(j+1)}=G_{i(j+1)}+\{[B_{(i-1)j}-G_{i-1j}]+[B_{(i-1)(j+2)}-G_{i-1)(j+2)}]+[B_{(i+1)j}-G_{(i+1)j}]+[B_{(i+1)(j+2)}-G_{(i+1)(j+2)}]\}/4 \quad \text{[Formula 6]}$$

$$R_{i(j+1)} = G_{(i+1)j} + \{[R_{i(j-1)} - G_{i(j-1)}] + [R_{i(j+1)} - G_{i(j+1)}] + [R_{(i+2)(j-1)} - G_{(i+2)(j-1)}] + [R_{(i+2)(j+1)} - G_{(i+2)(j+1)}]\}/4 \quad \text{[Formula 7]}$$

$$R_{(i+1)(j+1)} = G_{(i+1)(j+1)} + \{[R_{i(j+1)} - G_{i(j+1)}] + [R_{(i+2)(j+1)} - G_{(i+2)(j+1)}]\}/4 \quad \text{[Formula 8]}$$

$$R_{(i+1)(j+1)} = G_{(i+1)(j+1)} + \{[R_{(i+1)j} - G_{(i+1)j}] + [R_{(i+1)(j+2)} - G_{(i+1)(j+2)}]\}/2 \quad \text{[Formula 9]}$$

wherein R represents the red component, G represents the green component, B represents the blue component, and i, j represents coordinate values perpendicular to each other, and the dot at the position of [i, j] is a green dot, the dots at the position of [(i−1), j] and the position of [(i+1), j] are red dots, and the dots at the position of [i,(j−1)] and the position of [i,(j+1)] are green dots.

In addition, it can be understood that there are various technical solutions for performing R interpolation, G interpolation, and B interpolation on Bayer images. The present application is not limited to perform R interpolation, G interpolation, and B interpolation on Bayer images through the above-described technical solutions.

In the present embodiment, the image horizontal stitching or image vertical stitching can be optionally selected. The horizontal stitching and vertical stitching are described in more detail below.

Figure 6:
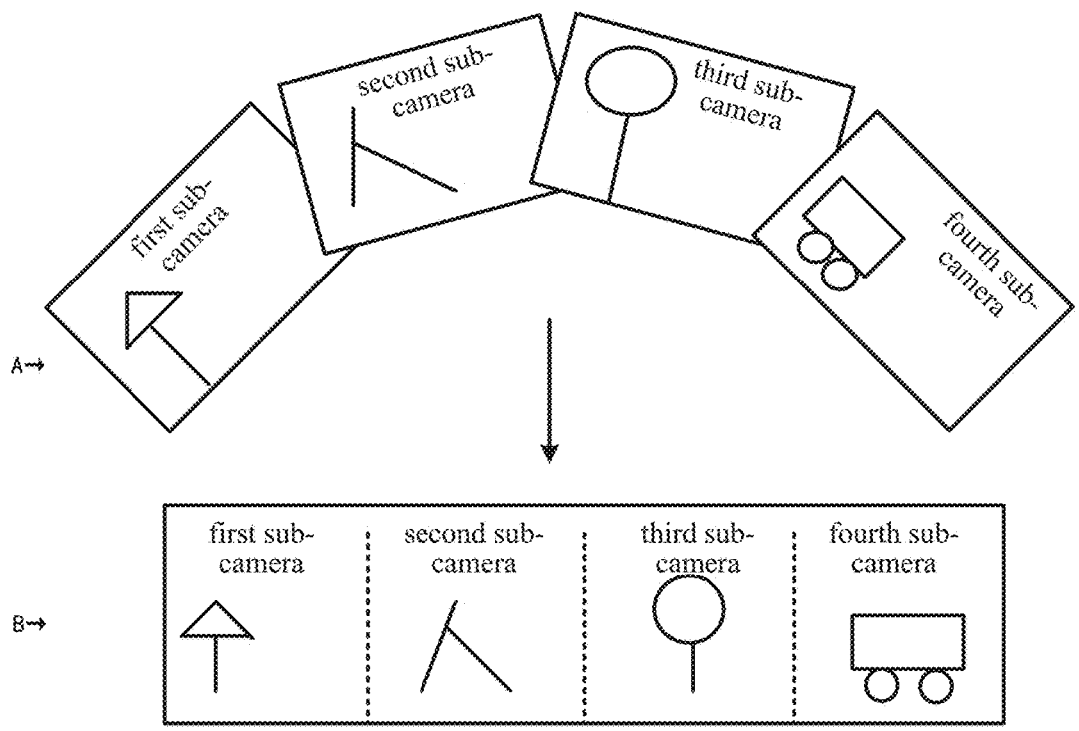
FIG. 6 is a schematic diagram showing stitching of images shot by the panoramic camera of the present application.
Figure 7:
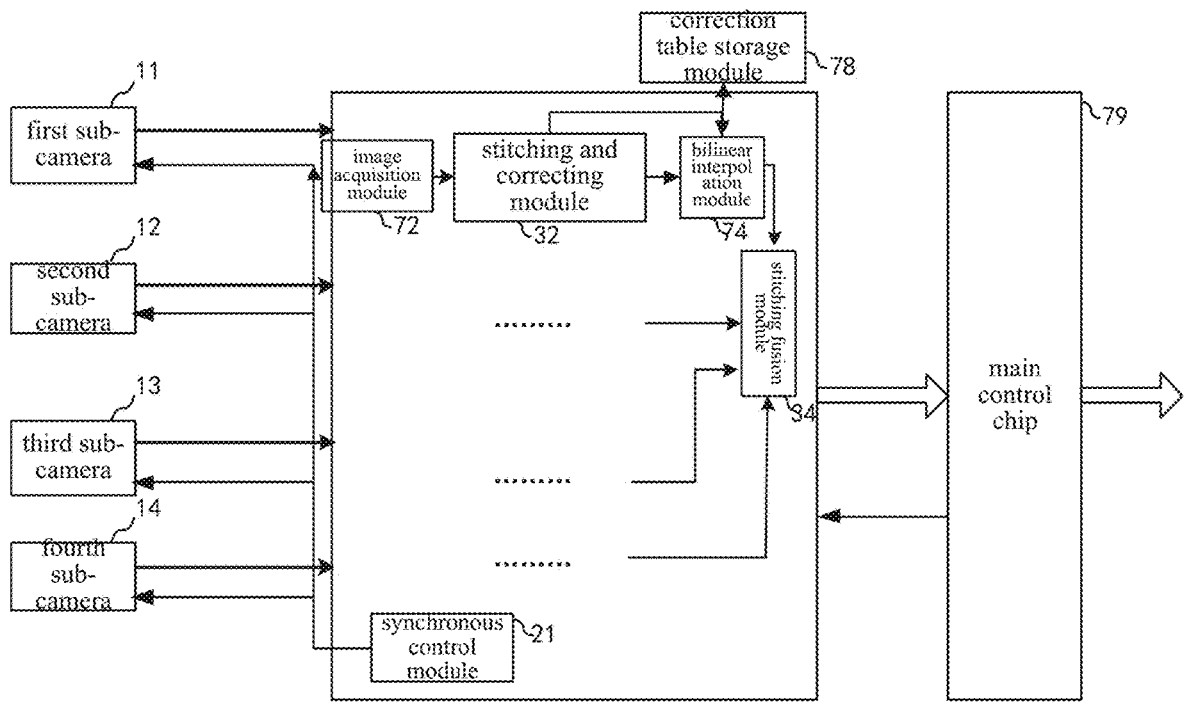
FIG. 7 is a schematic diagram showing the main modules of a panoramic camera in an embodiment of the present application.
Figure 8:
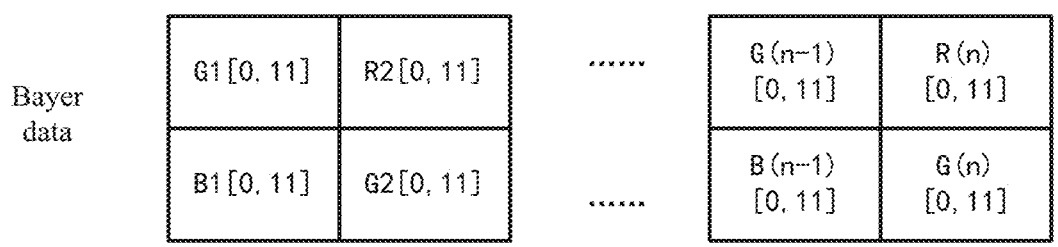
FIG. 8 is a schematic diagram showing a data format of a Bayer format image of the present application.

Referring to FIG. 6 to FIG. 14, a system for implementing the panoramic camera can be seen in FIG. 7. The system includes a first sub-camera 11, a second sub-camera 12, a third sub-camera 13 and a fourth sub-camera 14 of the panoramic camera, an image acquisition module 72, a stitching and correcting module 32, a bilinear interpolation module 74, a stitching fusion module 34, a synchronization control module 21, a correction table storage module 78, and a main control chip 79.

The data acquisition module 72 is used for acquiring the images shot by each sub-camera and converted the images into parallel image data with Bayer format. The format of the parallel data can be seen in FIG. 8.

The effect before and after stitching can be seen in FIG. 6, wherein the first image on the left corresponds to an image shot by the first sub-camera 11, the second image corresponds to an image shot by the second sub-camera 12, and so on.

In the scheme of image horizontal stitching, it is assumed that the resolution of each sub-camera in FIG. 7 is 1920*1080, and the images from the four sub-cameras are stitched according to the horizontal stitching scheme, and the resolution of the stitched image is: X*Y, wherein the theoretical resolution is less than 7680*1080, and the final resolution is related to lens and structure installation. Herein, for convenience of explanation, the description will be made with reference to 7168*1024.

Specifically, the input 4 pairs of LVDS (Low Voltage Differential Signaling) serial data is first acquired and received, and converted the data into parallel image data with Bayer format. The parallel data format can be seen in FIG. 8. Next, the parallel Bayer images are stitched and corrected, wherein the inputs of the stitching and correcting include a Bayer image and a stitching and correcting table (referred to as a "correction table") that is generated offline and located in an external memory, and the output of the stitching and correcting is an RGB image after stitching and correcting, see FIG. 9.

Figure 10:
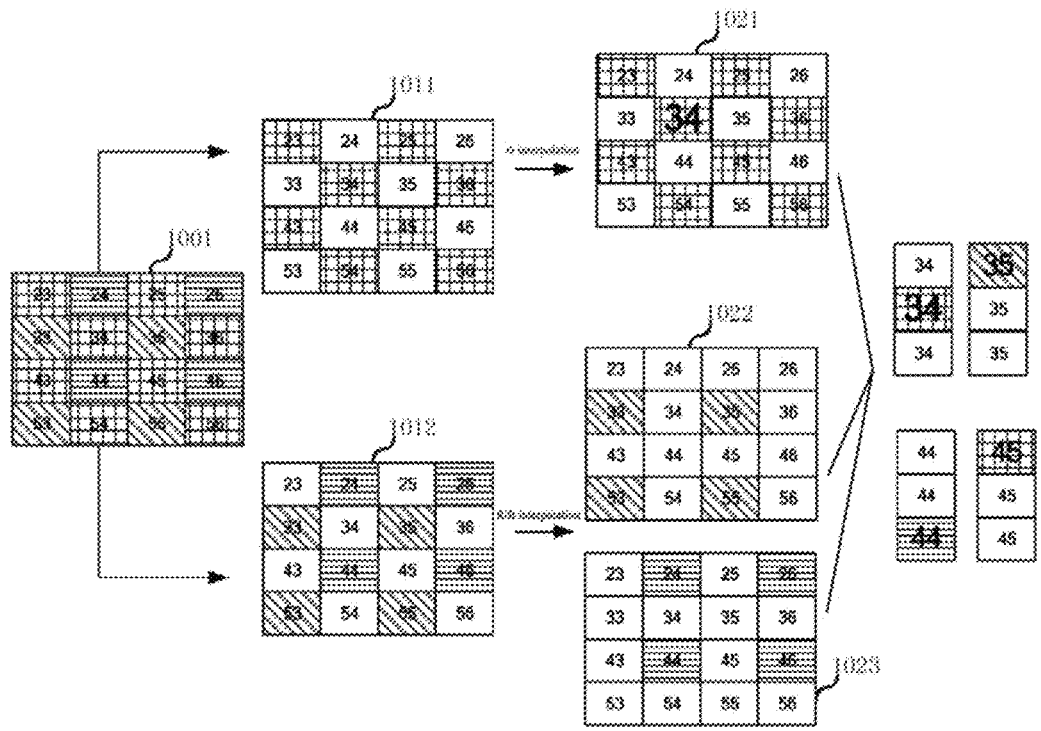
FIG. 10 is a schematic diagram showing a process of interpolating in an embodiment of the present application.

Further, the Bayer image needs to be interpolated first, and an RGB image is generated after the Bayer image is interpolated, wherein the interpolation process is as shown in FIG. 10. Specifically, referring to FIG. 10, the four dots "33", "35", "53" and "55" are red dots, "24", "26", "44", "46" are blue dots, and other dots are green dots. Moreover, the leftmost Bayer image (1001) can be decomposed into G image (1011) and RB image (1012), and a complete G image (1021) is generated by G interpolation, and a complete R image (1022) and a complete B image (1023) are generated by RB interpolation, finally, the R, G, and B primary colors are available at each pixel, and the interpolation from Bayer image to RGB is realized.

In the R, B interpolation process:

| | |
|---|---|
| position at point 34 R | Alpha1 = R33-g33 |
| | Beta1 = R35-g35 |
| | R34 = G34 + (Alpha1 + Beta1)/2 |
| position at point 34 B | Alpha1 = B24-g24 |
| | Beta1 = R44-g44 |
| | B34 = G34 + (Alpha1 + Beta1)/2 |
| position at point 35 B | Alpha1 = B24-g24 |
| | Alpha2 = B26-g26 |
| | Beta1 = B44-g44 |
| | Beta2 = B46-g46 |
| | B35 = g35 + (Alpha1 + Alpha2 + Beta1 + Beta2)/4 |
| position at point 44 R | Alpha1 = R33-g33 |
| | Alpha2 = R35-g35 |
| | Beta1 = R53-g53 |
| | Beta2 = R55-g55 |
| | R44 = g44 + (Alpha1 + Alpha2 + Beta1 + Beta2)/4 |
| position at point 45 R | Alpha1 = R35-g35 |
| | Bgta1 = R55-g55 |
| | R45 = G45 + (Alpha1 + Beta1)/2 |
| position at point 45 B | Alpha1 = B44-g44 |
| | Beta1 = B46-g46 |
| | B45 = G45 + (Alpha1 + Beta1)/2 |

Alpha1 and Beta1 represent the defined intermediate variables.

For the G interpolation, the direction is first judged, and the edge direction edgeDirection is calculated.

The method of calculating the edge direction is:

take the interpolated G35 component as an example to calculate the edge direction:

$$H = |G34 - G36| + |2*B35 - B33 - B37|;$$

$$V = |G25 - G45| + |2*B35 - B15 - B55|;$$

if H<V; then edgeDirection=0; (horizontal direction);
if H>V; then edgeDirection=1; (vertical direction);
if H=V; then edgeDirection=2; (without direction);
if edgeDirection=0;

$$G35 = (G34 + G36)/2 + (2*R35 - R33 - R37)/4;$$

if edgeDirection=1;

$$G35 = (G25 + G45)/2 + (2*R35 - R15 - R55)/4;$$

otherwise,
edgeDirection=2

$$G35 = (G34 + G36 + G25 + G45)/4 + (2*R35 - R33 - R37 + 2*R35 - R15 - R55)/8.$$

Similarly, the interpolation scheme for G45 is the same as G35, and the images finally output by the above interpolation are all R, G, and B three-color images.

Thereafter, the interpolated RGB image is input into the stitching and correcting module 32 to locally store the image, wherein the size of storage space of the stitching and correcting module 32 is related to the distortion of the image itself. In the present embodiment, the current lens adopts a 5 mm-8 mm lens. For example, the input image is 1920*1080, and the maximum distortion row number of the image is 69 rows. The memory architecture can be seen in FIG. 11. Specifically, the stitching and correcting module 32 shown in FIG. 11 internally stores the image in a row structure, and each address stores one pixel RBG value, and the designed maximum storage row number is the sum of the maximum distortion row number and 3. In the present embodiment, it is 72 rows, and the storage space obtained by calculation is: 1920*72*36 bits/8=622 KB, wherein 1920 is the number of pixels per row, R pixel dot, G pixel dot, B pixel dot each occupy 12 bits, the sum thereof is 36 bits, 8 bits is 1 Byte.

It should be noted that, in this embodiment, the stitching and correcting module 32 is implemented by the row_cache module, and in other embodiments of the present application, the stitching and correcting module 32 may also be implemented by other means.

The following describes the working mechanism of the stitching and correcting module 32 (row_cache module) in this embodiment: the input shot image is stored in the stitching and correcting module 32 in a row structure, after the stitching and correcting module 32 completes the area storage, the logic circuit simultaneously reads out the correction table from the external memory and analyzes the information of the correction table, wherein the correction table description information is that the pixel moves from the original coordinate point to the target address coordinate, and the image is corrected, that is, the pixel value of each coordinate point of the original image is moved to the corresponding coordinate position.

Figure 11:
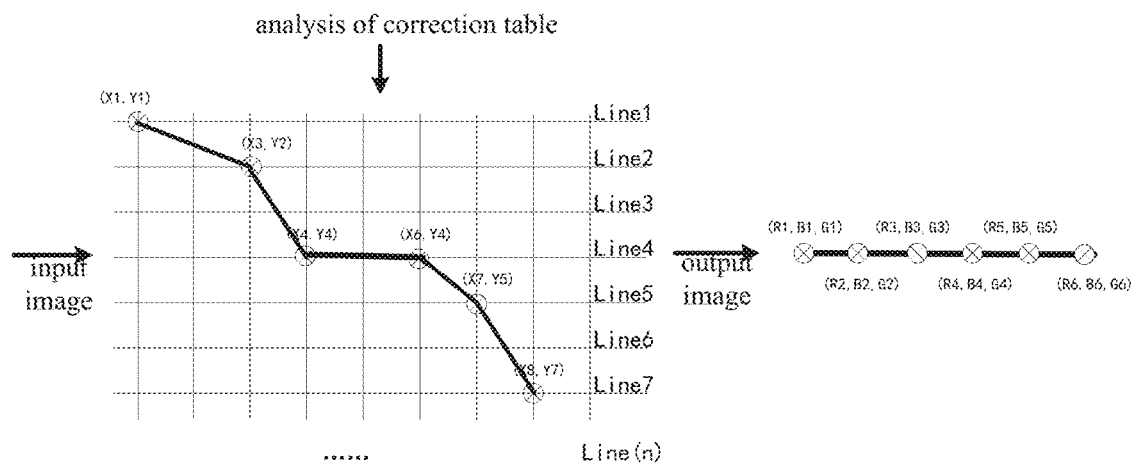
FIG. 11 is a schematic diagram of a storage architecture for an image before and after stitching and correcting in an embodiment of the present application.

Finding the pixel coordinates to be outputted from the stitching and correcting module 32 according to the information of the correction table, and reading out it from the stitching and correcting module 32, and transmitting it to the subsequent module for subsequent processing, as shown in FIG. 11, the coordinates of the stitching and correcting module 32 obtained in the correction table are: (X1, Y1); (X3, Y2); (X4, Y4); (X6, Y4); (X7, Y5); (X8, Y7) . . . , their value sequence output forms the first row of complete data, the corrected coordinates are (X1, Y1); (X2, Y1); (X3, Y1); (X4, Y1); (X5, Y1); (X6, Y1) . . . ; The pixel values corresponding to the output coordinate are RGB values corresponding to the input coordinate (X1, Y1); (X3, Y2); (X4, Y4); (X6, Y4); (X7, Y5); (X8, Y7), of which the RGB values are unchanged.

The scheme of locally caching by the stitching and correcting module 32 solves the problem of conventional scheme that needs cache all frames and then read and correct one frame by one frame, so that the correction algorithm itself does not need to consume memory bandwidth.

Figure 12:
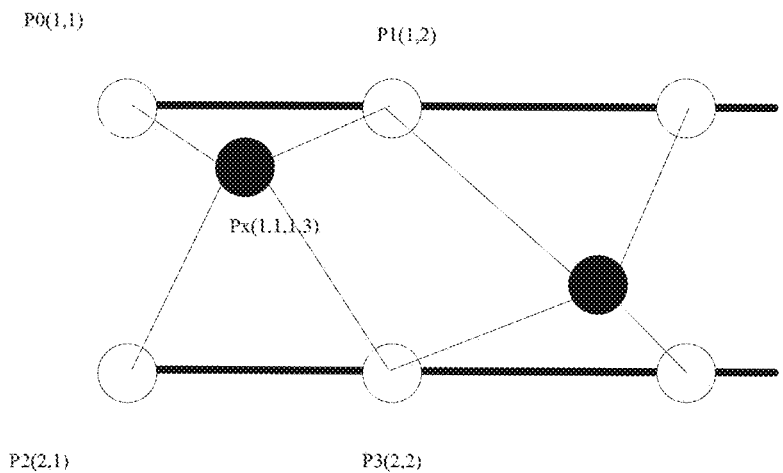
FIG. 12 is a schematic diagram of bilinear interpolation in an embodiment of the present application.

As shown in FIG. 12, the pixels of the desired position are taken out from the stitching and correcting module 32 one by one and are sequentially output.

Thereafter, the output image data is input to the bilinear interpolation module (as shown in FIG. 7). For the shot image corrected by the stitching and correcting module 32, according to the position of a target dot on an original image (that is, an image obtained by the above-described sub-cameras simultaneous shooting), a second pixel value is generated with reference to four pixels around the target dot, the bilinear interpolation is completed, and the bilinear interpolated image is transmitted to the stitching fusion module 34.

Specifically, as shown in FIG. 12, Px (1.1, 1.3), that is, the pixel value of the position coordinate at (1.1, 1.3) is:

Assume that the R component values of P0; P1; P2; P3 are: 100, 120, 140, 160;

set the weight of these four pixels, specifically, the closer the dot is to Px, the greater the weight; using the bilinear interpolation algorithm:

$$R \text{ component of } Px = (1-0.1)*(1-0.3)P0 + 0.1*(1-0.3)P1 + (1-0.1)*0.3P2 + 0.1*0.3P3 = 114;$$

Similarly, the values of the G and B components are obtained, and finally the bilinear interpolated image is output.

Then, the stitching fusion module 34 fuses the images of the four sub-cameras after stitching and correcting to form a complete large image, as shown in FIG. 6.

Figure 13:
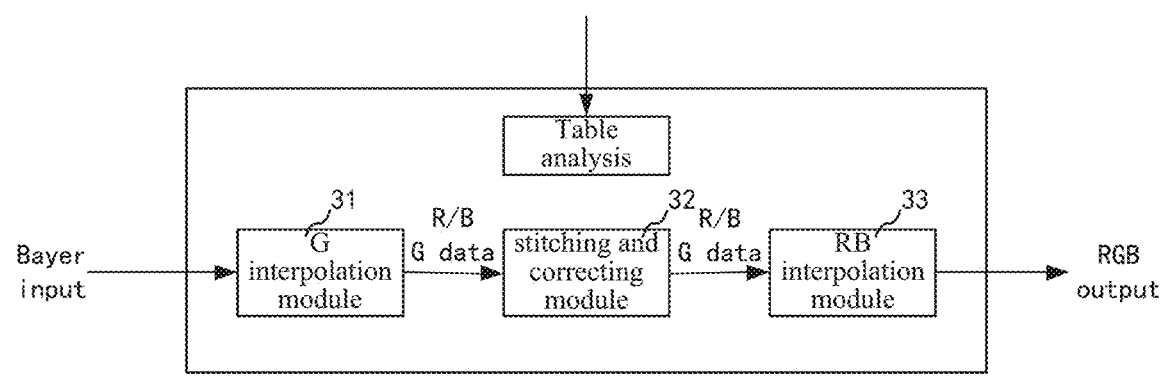
FIG. 13 is a schematic diagram showing a process of interpolating and correcting in an embodiment of the present application.

It should be noted that since the stitching and correcting module 32 stores RGB data, the internal cache requirement is high. Therefore, as shown in FIG. 13, the image in Bayer format is first B-interpolated by the G interpolation module 31, and then transmitted to the stitching and correcting module 32 for stitching and correcting, and then transmitted to the RB interpolation module 33 for RB interpolation, thereby outputting an image in RGB format. Specifically, the image data obtained by performing G-interpolating on the Bayer data by the G interpolation module 31 can be seen in FIG. 14, that is, the output format is R/B, G image format, specifically, the G component of each pixel is complete, and the R/B component pixel dot is obtained by adding G component on the original R/B component. That is, the R/B, G format image is stored in the stitching and correcting module 32. With the above improvements, there is a significant advantage that the stitching and correcting module 32 has a storage space that is one-half less than the original.

Specifically, in the original scheme, the storage space of the splicing correction module 32 is 1920*72*36 bits/8=622 KB, and after the improvement of the scheme, the storage space of the splicing correction module 32 is 1920*72*(12+24)/2/8 bits=311 KB. The entire design calculation amount is unchanged from the original scheme, except that the R and B component calculations are placed after the stitching and correcting module 32. That is, while reading the value in the stitching and correcting module 32, the R and B that need to be complemented are interpolated, that is, the correction algorithm and the interpolation are completed at the same time. In order to achieve the same processing speed as the original scheme in the design, a storage architecture of multi-port stitching and correcting module 32 is adopted, and the read bandwidth of the stitching and correcting module 32 is increased to meet the needs of the entire design.

It can be understood that, through the above scheme, the entire process does not need cache image, the required external memory bandwidth is as long as the read and write bandwidth of the calibration table is met. The improved scheme optimizes the internal stitching and correcting module 32, so that the internal cache reduction is advantageous for miniaturization of the design chip.

Furthermore, the advantage of the image horizontal stitching scheme is that the sensor is horizontally stitched, and the complete image after stitching is wider. The camera can adopt a lens with a relatively long focal length, and the solution adopts a 5-8 mm lens, so that the camera can be seen farther. The front-end processing system used in this design adopts the no-video frame cache mode as shown above, and the stitching and correcting module 32 is effectively controlled, making the whole scheme more effective.

Next, the image vertical stitching scheme will be described. If the resolution of each sub-camera is 1920*1080, and the image is first transposed 90 degrees, and then stitched, the image resolution after the stitching is completed is:X*Y, wherein the theoretical resolution is less than 4480*1920, and the resolution is related to the lens and the specific installation method. In order to facilitate the description of the present application, in this embodiment, 4096*1800 is taken as an example, and the effect after stitching can be seen in FIG. 15, and the main module structure can be seen in FIG. 17.

Figure 16:
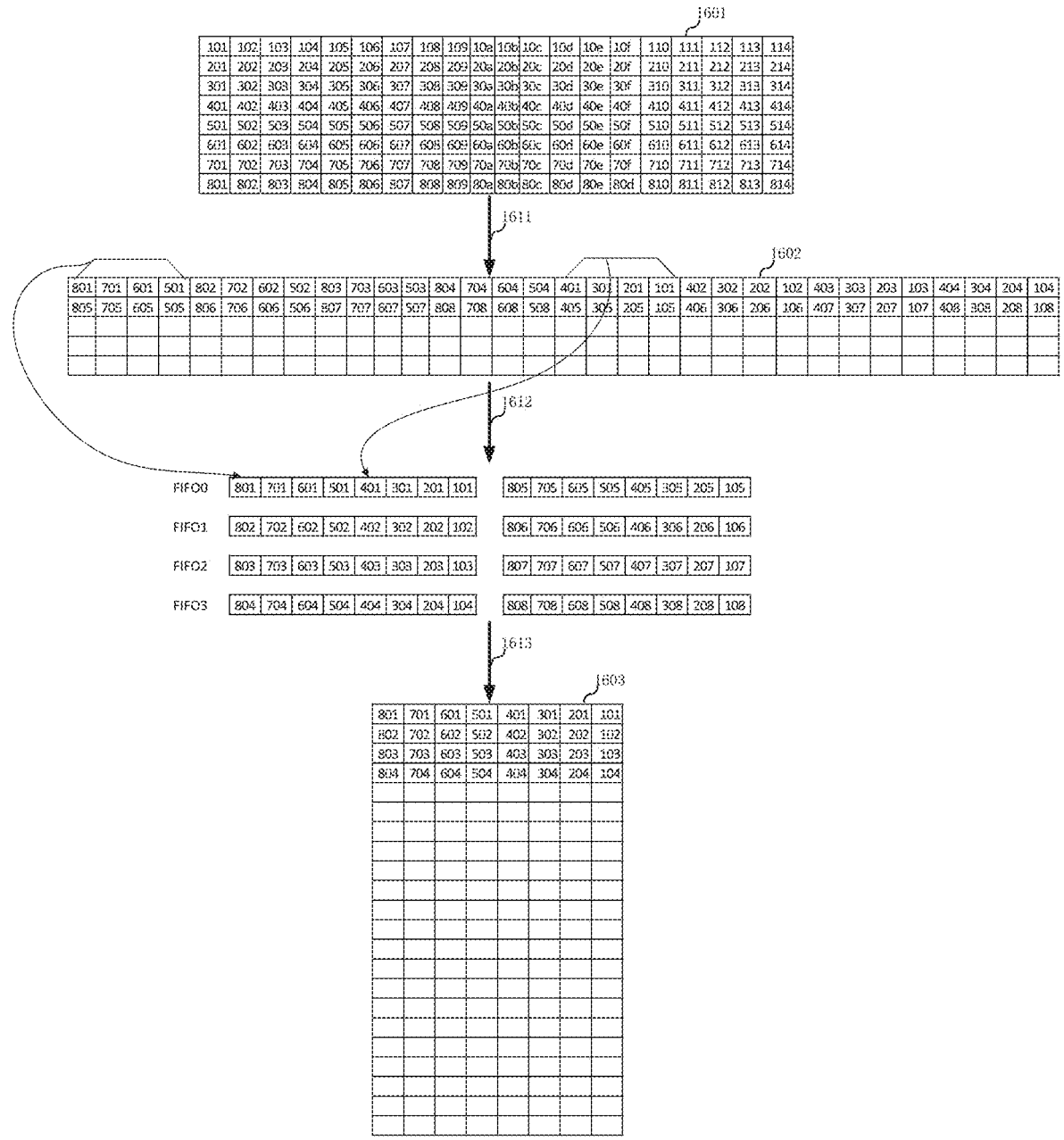
FIG. 16 is a schematic diagram of image rotation in an embodiment of the present application.
Figure 17:
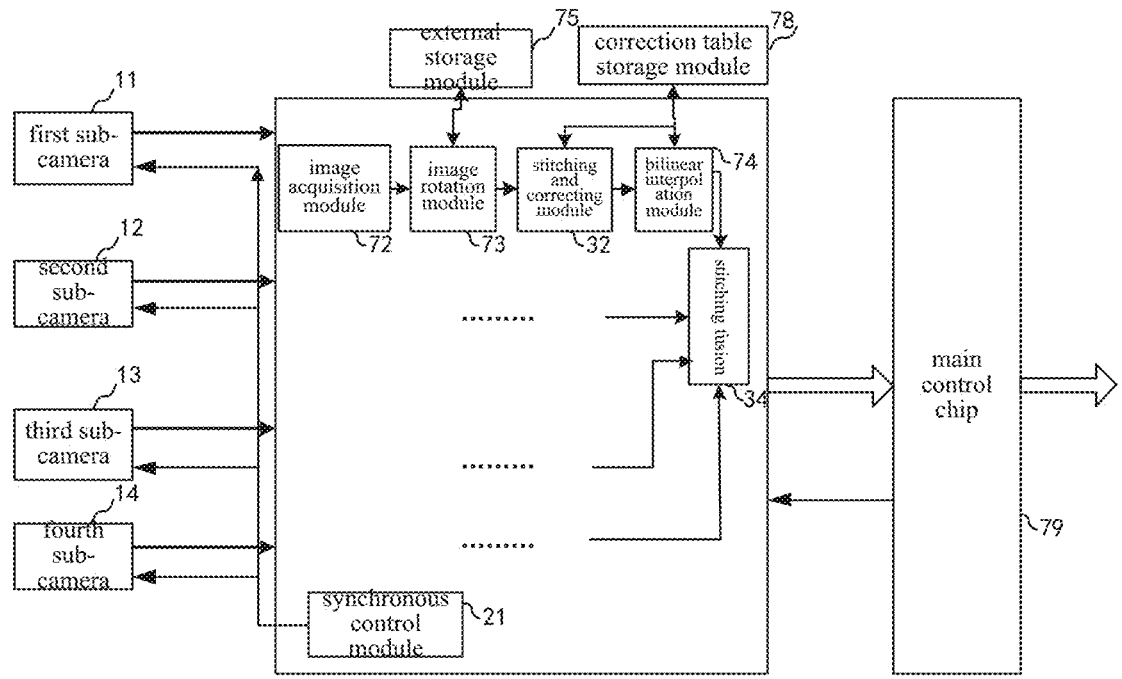
FIG. 17 is a schematic diagram showing the main modules of a panoramic camera in an embodiment of the present application.

Further, as shown in FIG. 17, the overall system scheme and the horizontal stitching scheme (see FIG. 7) differ in that an image rotation module 73 connected to the external storage module 75 is added. The image rotation module 73 is configured for rotating the images shot synchronously by the sub-cameras by 90 and transmitting the rotated images to the stitching and correcting module 32. Rotation implementation process can be seen in FIG. 16.

The following takes the input image (1601) as the 20*8 resolution as an example to briefly explain the process of the transposition scheme:

In step 1611, the input memory (1602) is prepared in block mode from the image (1601) input, and the memory storage format is 32*5. The data format of the image in the memory is as shown. The 2D block is expanded into one dimension for storage. The block used in the scheme is 4*4, 8*8 or 4*8 and other block sizes can be used in the project.

In step 1612, the data is read out from the memory (1602) in one-dimensional order. Then, the read data is divided into 4 FIFOs (first in first out queue) cache, and the sorting method is indicated by arrows in the figure, and 4 FIFOs are cyclically placed in units of 4 pixels, and the format of the final data in the FIFO is shown in the FIG. 16.

In step 1613, the data is cyclically read out from the four FIFOs to form an image (1603), the format is shown in FIG. 16, and resolution of the rotated image is 8*20.

After that, the rotated image is read out and organized into one frame of image data stream, and then transmitted to the stitching and correcting module, wherein the process of stitching and correcting module and the bilinear interpolation and stitching fusion process are the same as the above scheme, and will not be described again.

The advantages of the scheme of vertically stitching image: vertically stitching the sensor, the image after splicing is relatively complete, and the camera can use a relatively short focal length lens. The scheme uses a 4-5 mm lens, which makes the camera's upper and lower field of view larger. The design also adopts the no video frame cache mode, and the stitching and correcting module 32 is effectively controlled, so that the whole scheme is more effective.

It should be noted that each module mentioned in the embodiment of each device in the application is a logic module. Physically, a logical module can be a physical module, a part of a physical module, or a combination of a plurality of physical modules. The physical implementation of these logic modules is not the most important, and the combination of the functions implemented by these logic modules is the key to solving the technical problems raised by the present application. In addition, in order to highlight the innovative part of the present application, the foregoing device embodiments of the present application are not introduced into modules that are not closely related to solving the technical problems raised by the present application. This does not mean that there are no other modules in the above device embodiments.

The advantages of this embodiment are as follows:

the stitching and correcting module performs local caching (row caching) on the shot images, which effectively solves the problems arise in the prior art in the process of performing caching on all frames and then reading and correcting the shot images one frame by one frame, the process of stitching and correcting does not itself consume memory bandwidth, thereby greatly reducing the consumption of system resources.

By performing G interpolation processing on the shot images first, then performing stitching and correcting, and finally performing RB interpolation processing, the storage control of the stitching and correcting module can be reduced by half, and the resource consumption is significantly reduced.

The design of the overall system is simple, which facilitates miniaturization of the design.

The row cache based stitching and correcting processing combined with the Bayer interpolation algorithm can achieve the stitching and correcting processing well while ensuring the image quality.

Figure 2:
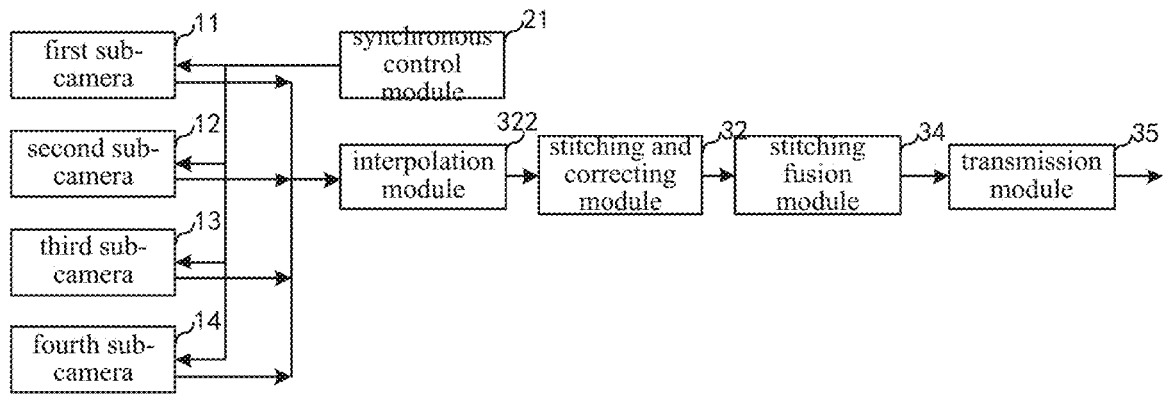
FIG. 2 is a schematic structural diagram of a panoramic camera according to another embodiment of the present application.
Figure 9:
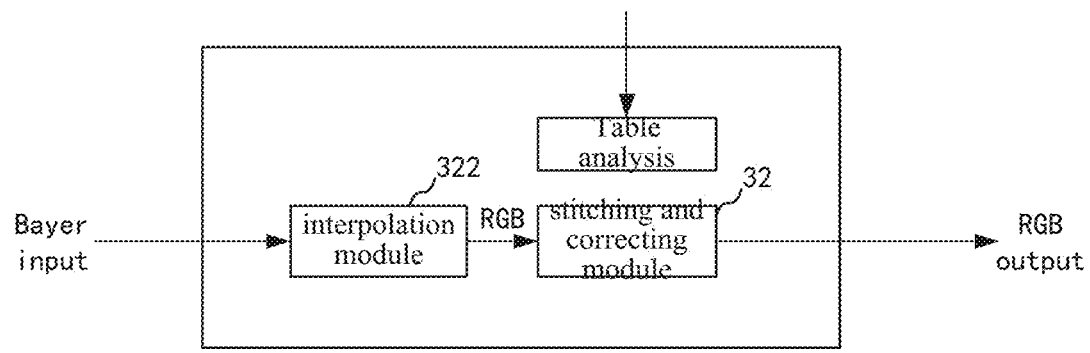
FIG. 9 is a schematic diagram showing a process of interpolating and correcting in an embodiment of the present application.

Referring to FIG. 2, a third embodiment of the present application provides a panoramic camera, which is different from the first embodiment and the second embodiment in that:

The images shot by the first sub-camera 11, the second sub-camera 12, the third sub-camera 13, and the fourth sub-camera 14 are images in Bayer format. Moreover, the panoramic camera further includes an interpolation module 322 for performing RGB interpolation on the images shot by each sub-camera. As shown in FIG. 9, the shot image in Bayer format is subjected to RGB interpolation by the interpolation module 322, and then transmitted to the stitching and correcting module 32, so that the format of the image output is of RGB format. As can be understood by referring to FIG. 9, in the present embodiment, the input of the stitching and correcting module 32 is an image in Bayer format, and a stitching and correcting table stored in the external memory, and the output is an RGB image after stitching and correcting. The interpolation process can be seen in FIG. 10. Specifically, the left side of FIG. 10 is an image in Bayer format, a complete G image is generated by G interpolation, and a complete R, B images are generated by RB interpolation. Finally, the R, G, and B primary colors are available at each pixel, thereby realizing interpolation from an image in Bayer format to the RGB format.

The R, B interpolation process is as follows:

| | |
|---|---|
| position at point 34 R | Alpha1 = R33-g33 |
| | Beta1 = R35-g35 |
| | R34 = G34 + (Alpha1 + Beta1)/2 |
| position at point 34 B | Alpha1 = B24-g24 |
| | Beta1 = R44-g44 |
| | B34 = G34 + (Alpha1 + Beta1)/2 |
| position at point 35 B | Alpha1 = B24-g24 |
| | Alpha2 = B26-g26 |
| | Beta1 = B44-g44 |
| | Beta2 = B46-g46 |
| | B35 = g35 + (Alpha1 + Alpha2 + Beta1 + Beta2)/4 |
| position at point 44 R | Alpha1 = R33-g33 |
| | Alpha2 = R35-g35 |
| | Beta1 = R53-g53 |
| | Beta2 = R55-g55 |
| | R44 = g44 + (Alpha1 + Alpha2 + Beta1 + Beta2)/4 |
| position at point 45 R | Alpha1 = R35-g35 |
| | Bgta1 = R55-g55 |
| | R45 = G45 + (Alpha1 + Beta1)/2 |
| position at point 45 B | Alpha1 = B44-g44 |
| | Beta1 = B46-g46 |
| | B45 = G45 + (Alpha1 + Beta1)/2 |

On the other hand, for the G interpolation, the direction judgment is first performed, and the edge direction edgeDirection is calculated. The calculation process of the edge direction is exemplified below:

take the interpolated G35 component as an example to calculate the edge direction:

$$H=|G34-G36|+|2*B35-B33-B37|;$$

$$V=|G25-G45|+|2*B35-B15-B55|;$$

if H<V; then edgeDirection=0; (horizontal direction);
if H>V; then edgeDirection==1; (vertical direction);
if H=V; then edgeDirection==2; (no direction);
if edgeDirection=0;

$$G35=(G34+G36)/2+(2*R35-R33-R37)/4;$$

if edgeDirection=1;

$$G35=(G25+G45)/2+(2*R35-R15-R55)/4;$$

otherwise,
edgeDirection=2

$$G35=(G34+G36+G25+G45)/4+(2*R35-R33-R37+2*R35-R15-R55)/8.$$

Similarly, the interpolation scheme of G45 is the same as G35, and the images finally output by the above interpolation are all R, G, and B three-color images.

Thereafter, the interpolated RGB image is input into the stitching and correcting module 32 to locally store the image, wherein the size of storage space of the stitching and correcting module 32 is related to the distortion of the image itself. In the present embodiment, the current lens adopts a 5 mm-8 mm lens. For example, the input image is 1920*1080, and the maximum distortion row number of the image is 72 rows. The memory architecture can be seen in FIG. 11.

Specifically, the stitching and correcting module 32 in FIG. 11 internally stores the image in a row structure, each address stores one pixel RBG value, and the designed maximum storage row number is the maximum distortion row number. That is, in the present embodiment, it is 72 rows, and in this case, the storage space obtained by calculation is: 1920*72*36 bits/8=622 KB.

The following briefly describes how row_cache works.

The input image is stored in the stitching and correcting module 32 in a row structure. When the stitching and correcting module 32 completes the area storage, the logic circuit simultaneously reads out the correction table from the external memory and analyzes the information of the correction table. It should be noted that the description information of the correction table is that the pixel moves from the original coordinate point to the target address coordinate. The correction of the shot image is completed, that is, the pixel value of each coordinate point of the original shot image is completed and moved to the corresponding coordinate position.

Specifically, finding the pixel coordinates to be outputted from the stitching and correcting module 32 according to the information of the correction table, and reading out it from the stitching and correcting module 32, and transmitting it to the subsequent module for subsequent processing, as shown in FIG. 11, the coordinates of the stitching and correcting module 32 obtained in the correction table are: (X1, Y1); (X3, Y2); (X4, Y4); (X6, Y4); (X7, Y5); (X8, Y7) . . . , their value sequence output forms the first row of complete data, the corrected coordinates are (X1, Y1); (X2, Y1); (X3, Y1); (X4, Y1); (X5, Y1); (X6, Y1) . . . ; The pixel values corresponding to the output coordinate are RGB values corresponding to the input coordinate (X1, Y1); (X3, Y2); (X4, Y4); (X6, Y4); (X7, Y5); (X8, Y7), of which the RGB values are unchanged.

The advantage of the scheme of locally caching by the stitching and correcting module 32 solves the problem of conventional scheme that needs cache all frames and then read and correct one frame by one frame, so that the correction algorithm itself does not need to consume memory bandwidth.

Next, as shown in FIG. 7, the output image of the RGB format is input to the bilinear interpolation module 74 to generate a final pixel value with reference to the surrounding four pixels in accordance with the position of an target dot on an original image.

Specifically, as shown in FIG. 12, take Px (1.1, 1.3), that is, the pixel value of the position coordinate at (1.1, 1.3) for example:

assuming that the R component values of P0; P1; P2; P3 are: 100, 120, 140, 160;

R component of Px=(1−0.1)*(1−0.3) P0+0.1*(1−0.3) P1+(1−0.1)*0.3 P2+0.1*0.3 P3=114.

Similarly, the values of the G and B components are obtained, and finally the bilinear interpolated image is output.

As shown in FIG. 7, the stitching fusion module 34 is used to fuse the above images after stitching and correcting to form a complete large shot image. See FIG. 6.

The basic working principle of the panoramic camera of this embodiment is similar to that of the foregoing embodiment, and details are not described herein.

The advantages of this embodiment are as follows:

the stitching and correcting module performs local caching (row caching) on the shot images, which effectively solves the problems arise in the prior art in the process of performing caching on all frames and then reading and correcting the shot images one frame by one frame, the process of stitching and correcting does not itself consume memory bandwidth, thereby greatly reducing the consumption of system resources.

The row cache based stitching and correcting processing combined with the Bayer interpolation algorithm can achieve the stitching and correcting processing well while ensuring the image quality.

The design of the overall system is simple, which facilitates miniaturization of the design.

Figure 18:
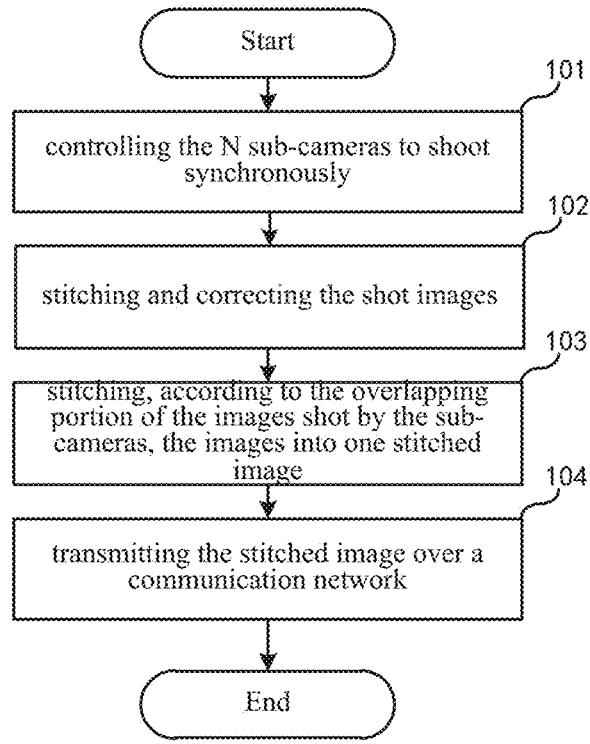
FIG. 18 is a schematic flow chart of a shooting method with a panoramic camera according to an embodiment of the present application.

Referring to FIG. 18, in the shooting method of the panoramic camera of this embodiment, the panoramic camera includes four sub-cameras, each sub-camera captures a different angle; an image shot by a sub-camera partially overlaps with an image shot by at least one of other sub-cameras in the panoramic camera; the method includes the following steps:

Step 101: controlling the four sub-cameras to shoot synchronously;

Step 102: stitching and correcting the images shot synchronously by the sub-cameras, including the following sub-steps: caching successive m rows of pixel values in the shot images in a sliding window manner, and correcting the pixel values according to a preset correction table and the cached m rows of pixel values, and sequentially outputting the corrected pixel values of each row, wherein m is greater than the sum of a preset maximum number of distortion rows and 2, and m is smaller than the total number of rows of the shot images;

Step 103: stitching, according to the overlapping portion of the images shot by the sub-cameras, the images into one stitched image;

Step 104: transmitting the stitched image over a communication network.

It should be noted that the above embodiments are device embodiments corresponding to the embodiments of the present method, and the present embodiment can be implemented in cooperation with the above embodiments. The related technical details mentioned in the above embodiments are still effective in the present embodiment, and are not described herein again in order to reduce the repetition. Accordingly, the related art details mentioned in the present embodiment can also be applied to the above embodiments.

The advantages of this embodiment are as follows:

through partially caching (row caching) the shot images, the problems in the prior art in the process of caching all frames and then reading and correcting the shot images one frame by one frame can be effectively solved, such that the process of stitching and correcting does not itself consume memory bandwidth, thereby greatly reducing the consumption of system resources. The design of the overall system facilitates miniaturization of the design.

The design of the overall system is simple, which facilitates miniaturization of the design.

Embodiment: Shooting Method 2 of the Panoramic Camera

The shooting method of the panoramic camera of the present embodiment is basically the same as that of the above embodiment, and will not be described again. The differences between them are as follows:

The images shot by each sub-camera are in Bayer format, and the shooting method of the present embodiment further includes the following steps:

performing RGB interpolation on the images shot synchronously by the respective sub-cameras.

Additionally, in another embodiment of the present application, after stitching and correcting the images shot synchronously by the sub-cameras, the method further includes:

for the corrected image, according to the position of a target dot on an original image, a second pixel value is generated with reference to four pixels around the target dot, and the bilinear interpolation is completed.

Similarly, the above embodiment is an apparatus embodiment corresponding to the embodiment of the method, and the embodiment can be implemented in cooperation with the above embodiment. The related technical details mentioned in the above embodiments are still effective in the present embodiment, and are not described herein again in order to reduce the repetition. Accordingly, the related art details mentioned in the present embodiment can also be applied to the above embodiments.

The advantages of this embodiment are as follows:

through partially caching (row caching) the shot images, the problems in the prior art in the process of caching all frames and then reading and correcting the shot images one frame by one frame can be effectively solved, such that the process of stitching and correcting does not itself consume memory bandwidth, thereby greatly reducing the consumption of system resources. The design of the overall system facilitates miniaturization of the design.

The row cache based stitching and correcting processing combined with the Bayer interpolation algorithm can achieve the stitching and correcting processing well while ensuring the image quality.

The design of the overall system is simple, which facilitates miniaturization of the design.

Embodiment: Shooting Method 3 of the Panoramic Camera

The shooting method of the panoramic camera of the present embodiment is basically the same as that of the above embodiment. The differences between them are as follows:

the images shot by each sub-camera are in Bayer format, and the shooting method of the present embodiment includes the following steps:

performing G interpolation on the images shot by the sub-cameras;

performing R interpolation and B interpolation on the G interpolated images.

Figure 19:
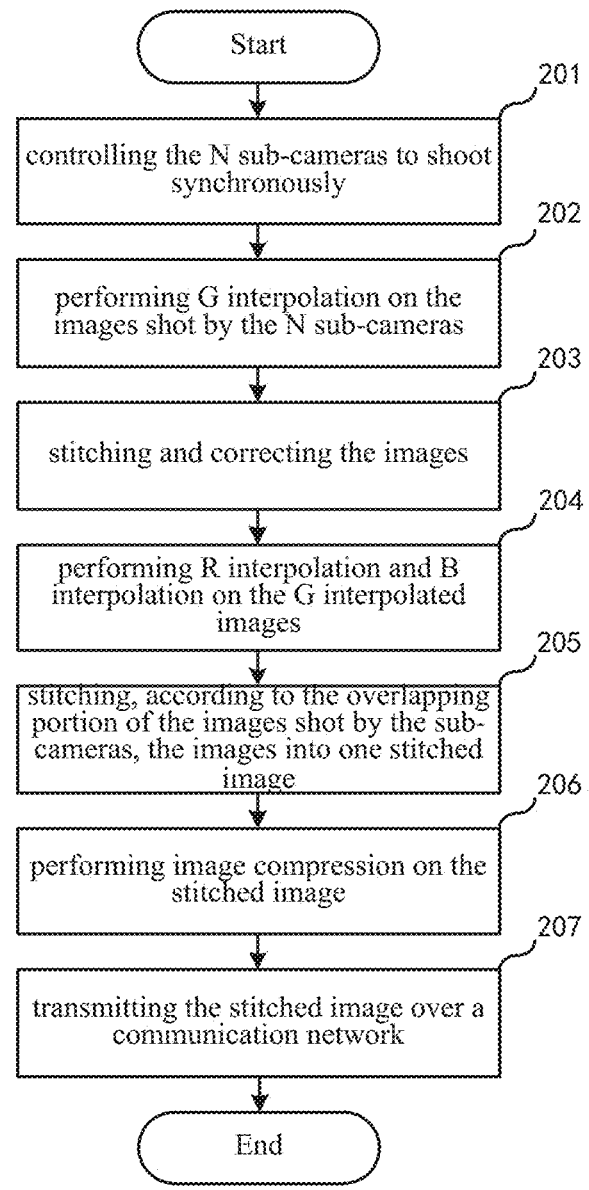
FIG. 19 is a schematic flow chart of a shooting method with a panoramic camera according to an embodiment of the present application.

Specifically, as shown in FIG. 19, the shooting method of the panoramic camera of the present embodiment includes the following steps:

Step 201: controlling the four sub-cameras to shoot synchronously;

Step 202: performing G interpolation on the images shot by the sub-cameras;

In the present embodiment, G interpolation is implemented by the following technical solutions:

$$H=|G_{ij}-G_{i(j+2)}|+|2*B_{i(j+1)}-B_{i(j-1)}-B_{i(j+3)}|$$

$$V=|G_{(i-1)(j+1)}-G_{(i+1)(j+1)}|+|2*B_{i(j+1)}-B_{(i-2)(j+1)}-B_{(i+2)(j+1)}|$$

wherein, H is the horizontal direction parameter and V is the vertical direction parameter;

if H<V, then edgeDirection=0, where edgeDirection is the edge direction, then:

$$G_{i(j+1)} = \frac{[G_{ij} + G_{i(j+2)}]}{2} + [2*R_{i(j+1)} - R_{i(j-1)} - R_{i(j+3)}]/4 \quad \text{[Formula 1]}$$

if H>V, then edgeDirection=1, and then:

$$G_{i(j+1)} = \frac{[G_{(i-1)(j+1)} + G_{(i+1)(j+1)}]}{2} + [2*R_{i(j+1)} - R_{(i-2)(j+1)} - R_{(i+2)(j+1)}]/4 \quad \text{[Formula 2]}$$

if H=V, then edgeDirection=2, and then:

$$G_{i(j+1)} = \frac{[G_{ij} + G_{i(j+2)} + G_{(i-1)(j+1)} + G_{(i+1)(j+1)}]}{4} + [2*R_{i(j+1)} - R_{i(j-1)} - R_{i(j+3)} + 2*R_{i(j+1)} - R_{(i-2)(j+1)} - R_{(i+2)(j+1)}]/8 \quad \text{[Formula 3]}$$

wherein, R represents the red component, G represents the green component, B represents the blue component, and i, j represents coordinate values perpendicular to each other, and the dot at the position of [i, j] is a green dot, the dots at the position of [(i−1), j] and the position of [(i+1), j] are red dots, and the dots at the position of [i,(j−1)] and the position of [i,(j+1)] are green dots.

Step 203: stitching and correcting the images shot synchronously by the sub-cameras, including: caching successive m rows of pixel values in the shot images in a sliding window manner, and correcting the pixel values according to a preset correction table and the cached m rows of pixel values, and sequentially outputting the corrected pixel values of each row, wherein m is greater than the sum of a preset maximum number of distortion rows and 2, and m is smaller than the total number of rows of the shot images.

Since the number of rows of corrected image must be smaller than that before the correction, in the image output process, the cache output has more than one row updated, but the output has only one row.

Assuming that the corrected image has n rows, for n from 1 to, the above sub-step 203 is repeatedly performed until all the rows of one image are corrected, where m equals to a preset maximum number of distortion rows=3.

In order to well understand the stitching and correcting process in step 203, further explanation and examples are given below.

The correction table stores information on the mapping relationship of the images before and after the correction, that is, for the pixels in the corrected image, the coordinate information of the pixels of a pre-corrected image corresponding thereto can be found in the correction table.

The correction header is included in the correction table. When outputting a row of images, you need to check the correction header of the current row. The correction header describes which rows of the corrected image come from which rows in the pre-corrected image, namely the start row and the end row. According to the correction header, if a row between the start row and the end row of the pre-corrected image corresponding to one row (referred to as the current row) of the corrected image to be output is already in the cache, the current row can be output from the cache.

Here is a specific example:

Assume that the pre-corrected has 1920 rows, and the number of output rows after correction is 1800 rows. Through analyzing the correction table, if you want to output 1800 rows of corrected images, you only need to use 1-1837 rows in the pre-corrected image, wherein the maximum distortion is less than 64 rows, and the selected stitching and correcting module 32 (i.e., the cache in units of rows) is 72 rows. Starting from each frame of image, the data sequence of pre-corrected image is sequentially written to the stitching and correcting module 32. When writing to 16 rows, according to the information in the correction header, the output of the first row of the corrected image (i.e., the current row) needs to use rows 1-16 of the pre-corrected image. At this time, the data already cached in the stitching and correcting module 32 has satisfied the requirement, and then the first row of the corrected image is output according to the mapping relationship information in the correction table. Then, the pixel of 17th row of the pre-corrected image is input to the stitching and correcting module 32. At this time, the stitching and correcting module 32 has 1-17 rows of data, it can be known that the 2-17 rows of the pre-corrected image is needed to output the second row of the corrected image according to the correction header information. While this condition is satisfied at this time, the second row of the corrected image is output based on the mapping relationship information in the correction table. By analogy, the pre-corrected image is input to the stitching and correcting module 32 row by row (if the stitching and correcting module 32 is full, the earliest input row is discarded according to the principle of the first in first out FIFO), and it is determined, according to the correction header information, whether the data in the current stitching and correcting module 32 can output the current one row of the corrected image, if so, the current one row of the corrected image is output, otherwise one row of data of the pre-corrected image is continuously input to the stitching and correcting module 32. There are two special cases that may exist in this process:

1. Write 1 row of the pre-corrected image to the stitching and correcting module 32, and determine, according to the information in the correction header, the row in the pre-corrected image required for the current one row of the corrected image to be output is not all in the stitching and correcting module 32, then, it is necessary to continue to input the next row of the pre-corrected image to the stitching and correcting module 32 to satisfy the output condition, that is, input 2 rows or even more rows to output I row;

2. After outputting one row of the corrected image, it is determined according to the information in the correction header that the relevant row of the pre-corrected image to be referred to in the next row of the corrected image to be output is already in the stitching and correcting module 32. At this time, it is no longer necessary to input a new row of the pre-corrected image to the stitching and correcting module 32 to continue outputting the corrected next row, that is, input 1 row of data can output 2 rows at this time.

The entire process is as described above. After the 1837th row of the pre-corrected image is input to the stitching and correcting module 32, when the data in the stitching and correcting module 32 satisfies the condition of the output of the 1800th row of the corrected image, the image of the 1800th row of the corrected image is output, and the image data of the subsequent 1837-1920 rows in the pre-corrected image is not written into the stitching and correcting module 32. When the new frame starts, the entire row_cache is cleared to the next cycle.

The rows and columns of the image referred to in the various embodiments of the present application can be customized by the user. For example, for an image of 1920*1080, 1920 can be defined as a row, 1080 as a column, or 1080 as a row, 1920 is defined as a column.

In a preferred embodiment, the maximum number of distortion rows of the image is obtained from the test image statistics, that is, the standard test image is shot by each sub-camera, and the shot image is compared with a standard test image, the position change of each pixel in the image before and after the shooting can be obtained, and then the number of rows spanned by the maximum distortion can be obtained, that is, the number of rows with maximum distortion of the image. In another example, the number of rows with maximum distortion of the image can be set based on empirical values.

Step 204: performing R interpolation and B interpolation on the G interpolated images.

In a preferred embodiment, R interpolation and B interpolation are implemented by the following technical solutions:

$$R_{ij}=G_{ij}+\{[R_{i(j-1)}-G_{i(j-1)}]+[R_{i(j+1)}-G_{i(j+1)}]\}/2 \quad \text{[Formula 4]}$$

$$B_{ij}=G_{ij}+\{[R_{(i-1)j}-G_{i-1j}]+[R_{(i+1)j}-G_{i+1j}]\}/2 \quad \text{[Formula 5]}$$

$$B_{i(j+1)}=G_{i(j+1)}+\{[B_{(i-1)j}-G_{i-1j}]+[B_{(i-1)(j+2)}-G_{(i-1)(j+2)}]+[B_{(i+1)j}-G_{(i+1)j}]+[B_{(i+1)(j+2)}-G_{(i+1)(j+2)}]\}/4 \quad \text{[Formula 6]}$$

$$R_{i(j+1)}=G_{(i+1)j}+\{[R_{i(j-1)}-G_{i(j-1)}]+[R_{i(j+1)}-G_{i(j+1)}]+[R_{(i+2)(j-1)}-G_{(i+2)(j-1)}]+[R_{(i+2)(j+1)}-G_{(i+2)(j+1)}]\}/4 \quad \text{[Formula 7]}$$

$$R_{(i+1)(j+1)}=G_{(i+1)(j+1)}+\{[R_{i(j+1)}-G_{i(j+1)}]+[R_{(i+2)(j+1)}-G_{(i+2)(j+1)}]\}/4 \quad \text{[Formula 8]}$$

$$R_{(i+1)(j+1)}=G_{(i+1)(j+1)}+\{[R_{(i+1)j}-G_{(i+1)j}]+[R_{(i+1)(j+2)}-G_{(i+1)(j+2)}]\}/2 \quad \text{[Formula 9]}$$

where R represents the red component, G represents the green component, B represents the blue component, and i, j represents coordinate values perpendicular to each other, and the dot at the position of [i, j] is a green dot, the dots at the position of [(i−1), j] and the position of [(i+1), j] are red dots, and the dots at the position of [i,(j−1)] and the position of [i,(j+1)] are green dots.

Step 205: stitching, according to the overlapping portion of the images shot by the sub-cameras, the images into one stitched image;

Step 206: performing image compression on the stitched image.

Step 207: transmitting the stitched image over a communication network.

Those skilled in the art can understand that for a complete RGB image, each pixel is composed of three colors of RGB, and one RGB image can be divided into three sub-images of three colors of R, G, and B.

G interpolation is to interpolate the green part of the Bayer image to obtain a complete green sub-image (G image).

R interpolation is to interpolate the red part of the Bayer image to obtain a complete red sub-image (R image).

B interpolation is to interpolate the blue part of the Bayer image to obtain a complete blue sub-image (B image).

The step of stitching and correcting may be performed after the step of performing the G interpolation, and the step of stitching and correcting may be performed before the step of performing the R interpolation and the B interpolation.

In another embodiment of the present application, G interpolation and RB interpolation may be performed first, and the stitching and correcting is performed after a complete RGB image is obtained.

In another embodiment of the present application, when the transmission bandwidth is sufficient, the stitched image may be directly transmitted without image compression.

In another embodiment of the present application, after correcting the images shot by the sub-cameras synchronously in a stitching manner, the method further includes:

for the corrected image, according to the position of a target dot on an original image, a second pixel value is generated with reference to four pixels around the target dot, and the bilinear interpolation is completed.

Therefore, in the shooting method of the present embodiment, the step of performing G interpolation on the images shot by each sub-camera is performed before the step of correcting the images in a stitching manner, and the step of performing R interpolation and B interpolation on the image after the G interpolation is performed after the step of correcting the images in a stitching manner.

Similarly, the above embodiment is an apparatus embodiment corresponding to the embodiment of the method, and the embodiment can be implemented in cooperation with the above embodiment. The related technical details mentioned in the above embodiments are still effective in the present embodiment, and are not described herein again in order to reduce the repetition. Accordingly, the related art details mentioned in the present embodiment can also be applied to the above embodiments.

The advantages of this embodiment are as follows:

through partially caching (row caching) the shot images, the problems in the prior art in the process of caching all frames and then reading and correcting the shot images one frame by one frame can be effectively solved, such that the process of stitching and correcting does not itself consume memory bandwidth, thereby greatly reducing the consumption of system resources. The design of the overall system facilitates miniaturization of the design.

By performing G interpolation processing on the shot images first, then performing stitching and correcting, and finally performing RB interpolation processing, the storage control of the stitching and correcting module 32 (stitching and correcting module) can be reduced by half and the resource consumption is significantly reduced.

The design of the overall system is simple, which facilitates miniaturization of the design.

The row cache based stitching and correcting processing combined with the Bayer interpolation algorithm can achieve the stitching and correcting processing well while ensuring the image quality.

In summary, the main advantages of this application include:

1) through partially caching (row caching) the shot images by the stitching and correcting module 32, the problems in the prior art in the process of caching all frames and then reading and correcting the shot images one frame by one frame can be effectively solved, such that the process of stitching and correcting does not itself consume memory bandwidth, thereby greatly reducing the consumption of system resources. The design of the overall system facilitates miniaturization of the design.

2) by performing G interpolation processing on the shot images first, then performing stitching and correcting, and finally performing RB interpolation processing, the storage control of the stitching and correcting module can be reduced by half, and the resource consumption is significantly reduced.

3) the design of the overall system is simple, which facilitates miniaturization of the design.

4) the row cache based stitching and correcting processing combined with the Bayer interpolation algorithm can achieve the stitching and correcting processing well while ensuring the image quality.

The embodiments of the present application further provide a panoramic camera, the panoramic camera includes N sub-cameras, a housing, a processor, a memory, a circuit board, and a power supply circuit; wherein N is greater than 2; each sub-camera captures a different angle; an image shot by a sub-camera partially overlaps with an image shot by at least one of other sub-cameras in the panoramic camera; the circuit board is disposed inside the space enclosed by the housing, and the processor and the memory are disposed on the circuit board; the power supply circuit is used for powering various circuits or devices of the panoramic camera; the memory is used for storing executable program code; the processor runs a program corresponding to the executable program code by reading the executable program code stored in the memory for performing the shooting method. The method includes:

controlling the N sub-cameras to shoot synchronously;

correcting the images shot by the sub-cameras synchronously in a stitching manner includes the following sub-steps: caching successive m rows of pixel values in the shot images in a sliding window manner, and correcting the pixel values according to a preset correction table and the cached m-row pixel values, and sequentially outputting the corrected pixel values of each row, wherein m is greater than the sum of a preset maximum number of distortion rows and 2, and m is smaller than the total number of rows of the shot images;

stitching, according to the overlapping portion of the images shot by the sub-cameras, the images into one stitched image;

transmitting the stitched image over a communication network.

Applying the embodiments shown in the present application, local caching (row caching) on the shot images, effectively solves the problems arise in the prior art in the process of performing caching on all frames and then reading and correcting the shot images one frame by one frame, the process of stitching and correcting does not itself consume memory bandwidth, thereby greatly reducing the consumption of system resources.

The embodiment of the present application further provides an executable program code, where the executable program code is used to perform the shooting method when being executed, and the method includes:

controlling the N sub-cameras to shoot synchronously;

correcting the images shot by the sub-cameras synchronously in a stitching manner includes the following sub-steps: caching successive m rows of pixel values in the shot images in a sliding window manner, and correcting the pixel values according to a preset correction table and the cached m-row pixel values, and sequentially outputting the corrected pixel values of each row, wherein m is greater than the sum of a preset maximum number of distortion rows and 2, and m is smaller than the total number of rows of the shot images;

stitching, according to the overlapping portion of the images shot by the sub-cameras, the images into one stitched image;

transmitting the stitched image over a communication network.

Applying the embodiments shown in the present application, local caching (row caching) on the shot images, effectively solves the problems arise in the prior art in the process of performing caching on all frames and then reading and correcting the shot images one frame by one frame, the process of stitching and correcting does not itself consume memory bandwidth, thereby greatly reducing the consumption of system resources.

The embodiment of the present application further provides a storage medium for storing executable program code, where the executable program code is used to perform the shooting method when being executed, and the method includes:

controlling the N sub-cameras to shoot synchronously;

correcting the images shot by the sub-cameras synchronously in a stitching manner includes the following sub-steps: caching successive m rows of pixel values in the shot images in a sliding window manner, and correcting the pixel values according to a preset correction table and the cached m-row pixel values, and sequentially outputting the corrected pixel values of each row, wherein m is greater than the sum of a preset maximum number of distortion rows and 2, and m is smaller than the total number of rows of the shot images;

stitching, according to the overlapping portion of the images shot by the sub-cameras, the images into one stitched image;

transmitting the stitched image over a communication network.

Applying the embodiments shown in the present application, local caching (row caching) on the shot images, effectively solves the problems arise in the prior art in the process of performing caching on all frames and then reading and correcting the shot images one frame by one frame, the process of stitching and correcting does not itself consume memory bandwidth, thereby greatly reducing the consumption of system resources.

The method embodiments of the present application can be implemented in software, hardware, firmware, and the like. Regardless of whether the application is implemented in software, hardware, or firmware, instruction code can be stored in any type of computer-accessible memory (e.g., permanent or modifiable, volatile or non-volatile, solid or non-solid, fixed or replaceable media, etc.). Similarly, the memory may be, for example, Programmable Array Logic ("PAL"), Random Access Memory (RAM), or Programmable Read Only Memory (PROM)"), Read-Only Memory ("ROM"), Electrically Erasable Programmable ROM ("EEPROM"), Disk, CD, Digital Versatile Disc ("DVD") and so on.

Each unit mentioned in the embodiment of each device in the application is a logic unit. Physically, a logical unit can be a physical unit, a part of a physical unit, or a combination of a plurality of physical unit. The physical implementation of these logic unit is not the most important, and the combination of the functions implemented by these logic unit is the key to solving the technical problems raised by the present application. In addition, in order to highlight the innovative part of the present application, the foregoing device embodiments of the present application are not introduced into units that are not closely related to solving the technical problems raised by the present application. This does not mean that there are no other modules in the above device embodiments.

All documents mentioned in this application are hereby incorporated by reference, just as each document is cited separately as a reference. In addition, it should be understood that various changes and modifications may be made by those skilled in the art after the above-described teachings of the present application, which are also within the scope of the appended claims.

Also, in the claims and the specification of the present patent, relational terms such as first and second are used merely to distinguish one entity or operation from another, it is not necessary to require or imply any such actual relationship or order between these entities or operations. Moreover, the terms "include", "comprise" or any other variants thereof are intended to cover a non-exclusive inclusion, such that processes, methods, articles, or devices comprising a series of elements comprise not only those elements listed but also those not specifically listed or the elements intrinsic to these processes, methods, articles, or equipment. Without further limitations, elements defined by the sentences "comprise(s) a . . . " or "include(s) a . . . " do not exclude that there are other identical elements in the processes, methods, articles, or devices which comprise these elements. In the claims and the specification of the patent, if it is mentioned that an action is performed according to an element, it means that the action is performed at least according to the element, there are two cases: the behavior is performed only according to the element, and the behavior is performed according to the element and other elements.

Although the present application has been illustrated and described with reference to certain preferred embodiments of the present application, it will be apparent to those skilled in the art that various changes may be made in the form and details without departing from the spirit and scope of the application.

The invention claimed is:

1. A shooting method of a panoramic camera, wherein the panoramic camera comprises N sub-cameras, N is greater than 2; each of the sub-cameras has a different shooting angle; an image shot by a sub-camera partially overlaps with an image shot by at least one of other sub-cameras in the panoramic camera;

the method comprises the following steps:
controlling the N sub-cameras to shoot synchronously;
stitching and correcting the images shot synchronously by the sub-cameras, comprising the following sub-steps:
caching successive m rows of pixel values in the shot images in a sliding window manner, and correcting the pixel values according to a preset correction table and the cached m rows of pixel values, and sequentially outputting the corrected pixel values of each row, wherein m is greater than the sum of a preset maximum number of distortion rows and 2, and m is smaller than the total number of rows of the shot images;
stitching, according to overlapping portion of the images shot by the sub-cameras, the images into one stitched image;
transmitting the stitched image over a communication network.

2. The shooting method of a panoramic camera of claim 1, wherein, the images shot by the N sub-cameras are images in Bayer format, and the method further comprises the following steps:
performing RGB interpolation on the images shot synchronously by the respective sub-cameras.

3. The shooting method of a panoramic camera of claim 1, wherein, the images shot by the N sub-cameras are images in Bayer format, and,
before correcting the images shot synchronously by the sub-cameras in a stitching manner, the method further comprises:
performing G interpolation on the images shot by the sub-cameras;
after correcting the images shot synchronously by the sub-cameras in a stitching manner, the method further comprises:
performing R interpolation and B interpolation on the G interpolated, stitched and corrected images.

4. The shooting method of a panoramic camera of claim 1, wherein,
after stitching and correcting the images shot synchronously by the sub-cameras, the method further comprises:
generating, for a corrected image, according to position of a target dot on an original image, with reference to four pixels around the target dot, a second pixel value, to complete the bilinear interpolation.

5. The shooting method of a panoramic camera of claim 1, wherein,
after controlling the N sub-cameras to shoot synchronously, the method further comprises:
rotating the images shot synchronously by the N sub-cameras by 90°.

6. The shooting method of a panoramic camera of claim 1, wherein, before transmitting the stitched image over a communication network, the method further comprises:
performing image compression on the stitched image.

7. A panoramic camera, comprising: N sub-cameras, a housing, a processor, a memory, a circuit board, and a power supply circuit; wherein N is greater than 2; each of the sub-cameras has a different shooting angle; an image shot by a sub-camera partially overlaps with an image shot by at least one other sub-camera in the panoramic camera; the circuit board is disposed inside a space enclosed by the housing, and the processor and the memory are disposed on the circuit board; the power supply circuit is used for powering various circuits or components of the panoramic camera; the memory is used for storing executable program code; the processor runs a program corresponding to the executable program code by reading the executable program code stored in the memory for performing a shooting method of a panoramic camera, wherein the method comprises the following steps:
controlling the N sub-cameras to shoot synchronously;
stitching and correcting the images shot synchronously by the sub-cameras, comprising the following sub-steps:
caching successive m rows of pixel values in the shot images in a sliding window manner, and correcting the pixel values according to a preset correction table and the cached m rows of pixel values, and sequentially outputting the corrected pixel values of each row, wherein m is greater than the sum of a preset maximum number of distortion rows and 2, and m is smaller than the total number of rows of the shot images;
stitching, according to overlapping portion of the images shot by the sub-cameras, the images into one stitched image;
transmitting the stitched image over a communication network.

8. A non-transitory computer-readable medium, wherein the storage medium is used to store an executable program code, and the executable program code is used to perform the shooting method of claim 1 when being executed.

9. The panoramic camera of claim 7, wherein, the images shot by the N sub-cameras are images in Bayer format, and the method further comprises the following steps:
performing RGB interpolation on the images shot synchronously by the respective sub-cameras.

10. The panoramic camera of claim 7, wherein, the images shot by the N sub-cameras are images in Bayer format, and,
before correcting the images shot synchronously by the sub-cameras in a stitching manner, the method further comprises:
performing G interpolation on the images shot by the sub-cameras;
after correcting the images shot synchronously by the sub-cameras in a stitching manner, the method further comprises:
performing R interpolation and B interpolation on the G interpolated, stitched and corrected images.

11. The panoramic camera of claim 7, wherein,
after stitching and correcting the images shot synchronously by the sub-cameras, the method further comprises:
generating, for a corrected image, according to position of a target dot on an original image, with reference to four pixels around the target dot, a second pixel value, to complete the bilinear interpolation.

12. The panoramic camera of claim 7, wherein,
after controlling the N sub-cameras to shoot synchronously, the method further comprises:
rotating the images shot synchronously by the N sub-cameras by 90°.

13. The panoramic camera of claim 7, wherein, before transmitting the stitched image over a communication network, the method further comprises:
performing image compression on the stitched image.

* * * * *